US012139430B2

(12) United States Patent
Sakurai et al.

(10) Patent No.: US 12,139,430 B2
(45) Date of Patent: Nov. 12, 2024

(54) WASH WATER PROCESSING APPARATUS AND STERILIZATION AND WATER-PURIFICATION APPARATUS, AND WASH WATER PROCESSING METHOD

(71) Applicants: KITZ CORPORATION, Chiba (JP); TOYO VALVE CO., LTD., Tokyo (JP)

(72) Inventors: Takako Sakurai, Chino (JP); Katsuhisa Yata, Chino (JP)

(73) Assignees: KITZ CORPORATION, Tokyo (JP); TOYO VALVE CO., LTD., Tokyo (JP)

(*) Notice: Subject to any disclaimer, the term of this patent is extended or adjusted under 35 U.S.C. 154(b) by 462 days.

(21) Appl. No.: 17/608,050

(22) PCT Filed: Apr. 27, 2020

(86) PCT No.: PCT/JP2020/018009
§ 371 (c)(1),
(2) Date: Nov. 1, 2021

(87) PCT Pub. No.: WO2020/226094
PCT Pub. Date: Nov. 12, 2020

(65) Prior Publication Data
US 2022/0212971 A1 Jul. 7, 2022

(30) Foreign Application Priority Data
May 8, 2019 (JP) ................... 2019-088634

(51) Int. Cl.
C02F 9/00 (2023.01)
C02F 1/00 (2023.01)
(Continued)

(52) U.S. Cl.
CPC ................ C02F 9/00 (2013.01); C02F 1/008 (2013.01); C02F 1/325 (2013.01); C02F 1/001 (2013.01);
(Continued)

(58) Field of Classification Search
CPC ............ C02F 9/00; C02F 1/008; C02F 1/325; C02F 1/001; C02F 1/283; C02F 1/32;
(Continued)

(56) References Cited

U.S. PATENT DOCUMENTS 4,778,532 A * 10/1988 McConnell ....... H01L 21/67028
134/28
5,447,640 A * 9/1995 Omi .......................... C02F 1/32
210/259
(Continued)

FOREIGN PATENT DOCUMENTS

CN 101973624 2/2011
JP 2-144195 6/1990
(Continued)

OTHER PUBLICATIONS

International Search Report issued Jul. 21, 2020 in International (PCT) Application No. PCT/JP2020/018009.
(Continued)

Primary Examiner — Fred Prince
(74) Attorney, Agent, or Firm — Wenderoth, Lind & Ponack, L.L.P.

(57) ABSTRACT

A wash water processing apparatus (12), a sterilization and water-purification apparatus, and a cleaning method include a control apparatus (16) formed of a storage part (16b) having stored therein an arithmetic expression capable of finding a discharge amount of processed water and a supply amount of pure water in accordance with an ozone concentration and a TOC concentration of processed water and a control part (16a) which controls the ozone supply part and TOC adjustment device (22). Supply of pure water to processed water of processed water, or discharge of processed water and supply of pure water is performed by the TOC concentration adjustment device in accordance with a result found from the arithmetic expression to reduce the
(Continued)

TOC concentration of wash water for use in a washing processing part (11) to a value equal to or smaller than a predetermined value.

6 Claims, 19 Drawing Sheets

(51) Int. Cl.
| | |
|---|---|
| *C02F 1/28* | (2023.01) |
| *C02F 1/32* | (2023.01) |
| *C02F 1/42* | (2023.01) |
| *C02F 1/44* | (2023.01) |
| *C02F 1/50* | (2023.01) |
| *C02F 1/72* | (2023.01) |
| *C02F 1/78* | (2023.01) |
| C02F 103/04 | (2006.01) |
| C02F 103/34 | (2006.01) |

(52) U.S. Cl.
CPC ............... *C02F 1/283* (2013.01); *C02F 1/32* (2013.01); *C02F 1/42* (2013.01); *C02F 1/44* (2013.01); *C02F 1/441* (2013.01); *C02F 1/444* (2013.01); *C02F 1/50* (2013.01); *C02F 1/725* (2013.01); *C02F 1/78* (2013.01); *C02F 2103/04* (2013.01); *C02F 2103/346* (2013.01); *C02F 2209/003* (2013.01); *C02F 2209/006* (2013.01); *C02F 2209/20* (2013.01); *C02F 2209/23* (2013.01); *C02F 2209/235* (2013.01); *C02F 2301/046* (2013.01); *C02F 2303/04* (2013.01); *C02F 2303/14* (2013.01); *C02F 2303/20* (2013.01); *C02F 2305/10* (2013.01)

(58) Field of Classification Search
CPC .... C02F 1/42; C02F 1/44; C02F 1/441; C02F 1/444; C02F 1/50; C02F 1/725; C02F 1/78; C02F 2103/04; C02F 2103/346; C02F 2209/003; C02F 2209/006; C02F 2209/20; C02F 2209/23; C02F 2209/235; C02F 2301/046; C02F 2303/04; C02F 2303/14; C02F 2303/20; C02F 2305/10
USPC .......................... 210/638, 739, 748.15, 760
See application file for complete search history.

(56) References Cited

U.S. PATENT DOCUMENTS

| | | | | |
|---|---|---|---|---|
| 5,518,624 | A | * | 5/1996 | Filson ................ B01D 71/0213 210/651 |
| 5,645,727 | A | * | 7/1997 | Bhave ................. B01D 71/024 210/651 |
| 2013/0020258 | A1 | | 1/2013 | Ellis |
| 2020/0255312 | A1 | * | 8/2020 | Yata ......................... C02F 1/44 |

FOREIGN PATENT DOCUMENTS

| | | |
|---|---|---|
| JP | 2-261594 | 10/1990 |
| JP | 4-225896 | 8/1992 |
| JP | 6-63570 | 3/1994 |
| JP | 6-254549 | 9/1994 |
| JP | 7-284799 | 10/1995 |
| JP | 10-202296 | 8/1998 |
| JP | 11-290878 | 10/1999 |
| JP | 2013-169512 | 9/2013 |

OTHER PUBLICATIONS

Office Action issued Mar. 2, 2023 in corresponding CN Application No. 202080034231.8.

* cited by examiner

WASH WATER PROCESSING APPARATUS AND STERILIZATION AND WATER-PURIFICATION APPARATUS, AND WASH WATER PROCESSING METHOD

BACKGROUND OF THE INVENTION

1. Technical Field

The present invention relates to a wash water processing apparatus for semiconductor manufacture, liquid-crystal manufacture, and electronic components, and wash water processing method for semiconductor manufacture, liquid-crystal manufacture, and electronic components, the apparatus and method purifying pure water used in a cleaning process in semiconductor manufacture, liquid-crystal manufacture, and electronic-component plating process so as to render pure water reusable.

2. Description of the Related Art

In the washing process in semiconductor-element and liquid-crystal glass manufacture or electronic-component plating process, large amounts of pure water are used to clean semiconductor wafer substrates, liquid-crystal glass substrates, glass substrates, plated electronic components, and so forth. In view of reduction of load on environments, effective utilization of water resources, and so forth, pure water used for cleaning have been widely collected and reused.

In the semiconductor element body manufacturing process and the liquid-crystal glass manufacturing process, an organic solvent is often used for peeling off a photoresist and so forth. In pure water (hereinafter referred to as "wash water") used in the semiconductor-element or liquid-crystal glass cleaning process, organic matters such as foreign matters, alcohol, and a surface-active agent are mixed. Thus, to collect this wash water for reuse in producing semiconductors, it is required to remove solid fine particles and organic matters contained in wash water.

When wash water containing organic matters is used in the cleaning process in semiconductor-element and liquid-crystal manufacture, an organic matter attached to a cleaning subject may cause a defect in a circuit pattern on a substrate surface or the like or may be carbonized in the subsequent heat treatment process to cause an insulation failure, thereby degrading product quality and degrading yields. Moreover, when wash water containing organic matters is used in the cleaning process in an electronic-component plating process, an organic matter attached to the product may make a short circuit or the like to degrade product quality and degrade yields.

Meanwhile, in the above-described cleaning process, wash water is collected, is subjected to filtration to remove solid fine particles and organic matters contained in wash water, and is then reused as pure water. Even for pure water hardly containing bacteria, bacteria already attached to the apparatus and the cleaning subject and bacteria that are present in the atmosphere enter pure water, and bacteria of a type growing even under poor nutrition grow while wash water is collected and reused, thereby contaminating pure water, a pure-water storage tank, a wash water accommodation tank, and the inside of piping which circulates these tanks.

Since bacteria are also organic matters, if bacteria-contaminated pure water is used in the cleaning process in semiconductor-element and liquid-crystal glass manufacture or in the cleaning process in electro-component plating process, this may cause a defect in a circuit pattern on a substrate surface or the like, or may make a short circuit or the like, thereby degrading product quality and degrading yields.

Therefore, to keep these bacteria that are inevitably present in pure water at a low level as much as possible, it is required to: regularly stop the manufacturing apparatus; disinfect and clean, with a disinfectant such as sodium hypochlorite, the inside of a pure-water storage tank, a wash water accommodation tank, and piping for circulation among these tanks in a cleaning apparatus (hereinafter referred to as "washing processing part"); wipe off a biofilm attached to a wall surface of a water accommodation tank; and also perform exhaustive post-cleaning the inside of the apparatus with pure water so that no bactericide remains inside the washing processing part and fill the washing processing part with new pure water.

Since pure water is expensive, frequent replacement invites an increase in product manufacturing cost. Also, disinfection of the inside of the washing processing part performed by regularly stopping the manufacturing apparatus decreases the rate of operation of the manufacturing apparatus to invite an increase in product manufacturing cost.

Moreover, when wash water used in the cleaning process is collected and reused, normally, after relatively large organic matters in wash water are trapped and removed by a filtration device such as a hollow fiber membrane filter or activated carbon, and wash water is then brought into contact with an ion exchange resin (positive ion exchange resin, negative ion exchange resin) to remove ion in wash water, and is then reused as pure water. However, if bacteria grow in wash water, clogging of the filtration device and reduction in function of the ion exchange resin occur early, and the frequency of replacement of the filter and the ion exchange resin of the filtration device increases, thereby pushing up product manufacturing cost.

Conventionally, it has been known that when pure water is circulated for use, as means for killing bacteria in pure water, ozone injection is effective. For example, suggested in PTL 1 is an ultrapure-water producing apparatus in which, to prevent bacteria from growing in circulating ultrapure water for use, an ozone injection apparatus is annexed to piping for returning ultrapure water not used at a use point to an ultrapure water tank and ozone is injected by this ozone injection apparatus to ultrapure water to always disinfect ultrapure water.

Previously, pure water and ultrapure water have been defined in view of resistivity (electrical conductivity). However, from the enhancement of water quality requirements for pure water and ultrapure water, the organic amount in TOC (Total Organic Carbon) notation becomes defined as indexes of pure water and ultrapure water in recent years, and it is required that TOC be equal to or smaller than 1.0 mg/L for pure water and be equal to or smaller than 0.01 mg/L for ultrapure water. When pure water containing ozone makes contact with a resin-made portion such as, for example, piping, a problem occurs in which a resin organic material is eluted to increase the TOC concentration of pure water and degrade resin.

As a technique for preventing an increase in TOC concentration of pure water while ozone is supplied to pure water to kill bacteria in pure water, disclosed in PTL 2 is an ultrapure-water producing and supply apparatus in which ozone at a low concentration is continuously injected at an appropriate position in a circulation line during continuous operation to kill bacteria in ultrapure water, residual ozone in ultrapure water is dissolved by a low-pressure ultraviolet ozone dissolving apparatus provided on a downstream side of the injecting position, and ultrapure water with the number of bacteria and the TOC concentration extremely decreased is supplied to a use point.

Also disclosed in PTL 3 is an ozone-containing-water processing apparatus for treating ozone residing in water, the apparatus being capable of: reliably removing residual ozone and dissolved oxygen by a combination of an ultraviolet-ray irradiation apparatus, a deaeration apparatus, and a catalytic resin device or an activated carbon dissolving device; and efficiently removing hydrogen peroxide, which is a by-product at the time of ultraviolet-ray irradiation, for incorporation and use in a process of producing cleaning water in the electronics industry.

CITATION LIST

Patent Literatures

PTL 1: Japanese Patent Application Laid-Open No. 2-261594
PTL 2: Japanese Patent Application Laid-Open No. 2-144195
PTL 3: Japanese Patent Application Laid-Open No. 6-254549

SUMMARY OF THE INVENTION

1. Technical Problem

However, in the ultrapure-water producing and supply apparatus of PTL 2, ozone is not contained in pure water that is present in the low-pressure ultraviolet ozone dissolving apparatus to the ozone injecting point. Also, in the ozone-containing-water processing apparatus of PTL 3, ozone is not contained in pure water that is present in the catalytic resin device or the activated carbon dissolving device to the ozone injecting point. Thus, a possibility is not resolved yet that bacteria attached to a cleaning subject proliferate at the use point and inside piping, which are deozonized zones. If bacteria proliferate in these locations, degradation in product quality and degradation in yields occur. Also, problems occur in which frequent replacement due to impairment in filtration performance and ion exchange power of a filtration film and an ion exchange resin and regular cleaning and sterilization of the apparatus are required to decrease the rate of operation.

Moreover, if slime occurs in the filtration device (filter) configuring a filtration mechanism part or an ion exchange resin device due to bacteria and so forth that are present in the apparatus, the quantity of flow through the filtration mechanism part decreases to decrease the filtration performance and disable the function of the ion exchange resin device.

The ultrapure-water ozone disinfection method and apparatus of PTL 2 prevents TOC elution from resin-made piping and pure-water tank from an ozone supply part where ultrapure water containing ozone is present to an inlet of a membrane deaeration device. Thus, for the pure-water tank and the piping from the ozone supply part to the inlet of the membrane deaeration device, a stainless steel with its surface mirror-finished by electropolishing or the like is used, which makes the apparatus expensive to invite an increase in manufacturing cost.

The present invention was developed to solve the above-described problems, and has an object to provide a wash water processing apparatus for semiconductor manufacture, liquid-crystal manufacture, and electronic components, and wash water processing method for semiconductor manufacture, liquid-crystal manufacture, and electronic components, the apparatus and method capable of effectively performing disinfection of bacteria and decomposition of organic matters contained in pure water for reuse, reducing a TOC concentration of pure water to a value equal to or smaller than a predetermined value, and operating for a long period of time in a simple structure.

2. Solution to the Problem

To achieve the above-described object, the invention is directed to a wash water processing apparatus for semiconductor manufacture, liquid-crystal manufacture, and electronic components, the apparatus having: a washing processing part for cleaning at semiconductor manufacture or liquid-crystal manufacture and cleaning electronic components; a wash water storage part connected via a circulation flow path to this washing processing part to let pure water after cleaning flow as processed water for storage; a sterilization and purification unit which has an ozone supply part connected to this wash water storage part via a flow-in flow path and a flow-out flow path so that processed water is circulatable; a filtration mechanism part connected to a subsequent stage of the wash water storage part via a filtration flow path and formed of a filtration device of a filter such as a hollow fiber membrane filter or an activated carbon filter and an ion exchange resin; the circulation flow path connecting a subsequent stage of this filtration mechanism part and the washing processing part; and TOC concentration measurement means and TOC concentration adjustment means provided midway in this circulation flow path, wherein: the washing processing part, the wash water storage part, and the filtration mechanism part and, furthermore, the filtration mechanism part and the washing processing part are connected to configure the entire wash water processing apparatus in an endless, circulatable form; the TOC concentration adjustment means is adjustment means for performing discharge of processed water and supply of pure water to reduce elusion of TOC from each portion configuring the wash water storage part and the filtration mechanism part; furthermore, the apparatus includes a control apparatus having a storage part having stored therein an arithmetic expression capable of finding a discharge amount of processed water and a supply amount of pure water in accordance with an ozone-water concentration and a TOC concentration of processed water; bacteria and so forth in processed water in the wash water storage part are sterilized and decomposed by circulation between the wash water storage part and the sterilization and purification unit; the ozone-water concentration is controlled at a low concentration by mixture of processed water flowing in from the washing processing part and stored in the wash water storage part and sterilized and dissolved processed water and by autolysis of ozone; the control apparatus controls the ozone supply part to supply, from wash water storage part, low-concentration ozone water having an ozone-water concentration equal to or smaller than 5.37 mg/L to the filtration mechanism part to an extent that the filter and the ion exchange resin are not oxidized or degraded; this low-concentration ozone water reduces an occurrence of slime occurring to the filter and the ion exchange resin itself without decreasing filtration performance of the filtration mechanism part; and, furthermore, in accordance with a TOC concentration eluted from each portion configuring the wash water storage part and the filtration mechanism part, by discharge of processed water and supply of pure water at the TOC concentration adjustment means, the TOC concentration of wash water for use is controlled at a management value equal to or smaller than 1.0 mg/L in pure water before the wash water processing part to control so that processed water is usable for cleaning at the washing processing part.

The invention according to another aspect is directed to a wash water processing apparatus for semiconductor manufacture, liquid-crystal manufacture, and electronic components, wherein the arithmetic expression can compute by using a data table.

The invention according to another aspect is directed to a wash water processing method for semiconductor manufacture, liquid-crystal manufacture, and electronic components, the method including: a small-circulation-system circulation step of circulation by a washing processing part for cleaning at semiconductor manufacture or liquid-crystal manufacture and cleaning electronic components, a wash water storage part connected via a circulation flow path to this washing processing part to let pure water after cleaning flow as processed water for storage, a sterilization and purification unit which has an ozone supply part connected to this wash water storage part via a flow-in flow path and a flow-out flow path so that processed water is circulatable; a large-circulation-system circulation step of circulation having a filtration mechanism part connected to a subsequent stage of the wash water storage part via a filtration flow path and formed of a filtration device of a filter such as a hollow fiber membrane filter or an activated carbon filter and an ion exchange resin, the circulation flow path connecting a subsequent stage of this filtration mechanism part and the washing processing part, and TOC concentration measurement means and TOC concentration adjustment means provided midway in this circulation flow path, and having the washing processing part, the wash water storage part, and the filtration mechanism part and, furthermore, the filtration mechanism part and the washing processing part being connected to configure the entire wash water processing apparatus in an endless, circulatable form; and a control step in which the TOC concentration adjustment means is adjustment means for performing discharge of processed water and supply of pure water to reduce elusion of TOC from each portion configuring the wash water storage part and the filtration mechanism part and, furthermore, the apparatus includes a control apparatus having a storage part having stored therein an arithmetic expression capable of finding a discharge amount of processed water and a supply amount of pure water in accordance with an ozone-water concentration and a TOC concentration of processed water, wherein: bacteria and so forth in processed water in the wash water storage part are sterilized and decomposed by circulation between the wash water storage part and the sterilization and purification unit the ozone-water concentration is controlled at a low concentration by mixture of processed water flowing in from the washing processing part and stored in the wash water storage part and sterilized and dissolved processed water and by autolysis of ozone; the control apparatus controls the ozone supply part to supply, from wash water storage part, low-concentration ozone water having an ozone-water concentration equal to or smaller than 5.37 mg/L to the filtration mechanism part to an extent that the filter and the ion exchange resin are not oxidized or degraded; this low-concentration ozone water reduces an occurrence of slime occurring to the filter and the ion exchange resin itself without decreasing filtration performance of the filtration mechanism part; and, furthermore, in accordance with a TOC concentration eluted from each portion configuring the wash water storage part and the filtration mechanism part, by discharge of processed water and supply of pure water at the TOC concentration adjustment means, the TOC concentration of wash water for use is controlled at a management value equal to or smaller than 1.0 mg/L in pure water before the wash water processing part to allow use for cleaning at the washing processing part.

The invention according to another aspect is directed to the wash water processing method for semiconductor manufacture, liquid-crystal manufacture, and electronic components, wherein the arithmetic expression can compute by using a data table.

3. Advantageous Effects of the Invention

From the present invention, after bacteria contained in processed water are killed and filtration of solid particulate matters and organic matters is performed by the wash water processing apparatus, the TOC concentration adjustment means performs supply of pure water and discharge of processed water and supply of pure water in accordance with the ozone-water concentration and the TOC concentration of processed water. Thus, the processed water with the TOC concentration reduced to a concentration equal to or smaller than the predetermined concentration can be returned to the washing processing part (use point). Thus, it is possible to clean a product, such as an electronic component or a liquid-crystal glass substrate brought to the washing processing part, with wash water satisfying water quality requirements, prevent degradation in product quality, and improve yields in manufacture.

Also, since processed water that is present in the wash water processing apparatus contains ozone at a low concentration, it is possible to reduce the growth of bacteria in the wash water processing apparatus and piping. Thus, clogging of the filter of the filtration mechanism part with bacteria and reduction in function of the ion exchange resin less tend to occur, and the lives of these can be extended. Furthermore, with the growth of bacteria being reduced, it is possible to reduce the occurrence of a biofilm in the filtration mechanism part and, as a result, and intervals of cleaning by and to the wash water processing apparatus can be prolonged.

In addition to this, the initially-set arithmetic expression is set by using a member where TOC tends to be eluted (resin) and in an environment at an ozone-water concentration at a high concentration to the extent of being hardly used industrially. Thus, if this arithmetic expression is used in an environment at an ozone-water concentration lower than that of the setting conditions of this arithmetic expression and using a member where TOC less tends to be eluted, the arithmetic expression can be used as it is without being rewritten. Also, if a water-treatment environment where the wash water processing apparatus is actually used (treatment water amount, current pure-water supply amount, current ozone-water concentration) can be known from the arithmetic expression, the duration of the ozone-water concentration required for sterilization and purification can be found.

Furthermore, by the ozone supply part, supply is made as reducing the concentration of residual ozone water after ozonizing to a value smaller than 5.37 mg/L. Thus, while organic matters such as bacteria in processed water are purified with ozone to render water reusable, the inside of the filtration mechanism part is also sterilized, reactions between a resin member or the like in a flow path after this filtration mechanism part and ozone are reduced to inhibit degradation the occurrence of slim occurring in the filter and the ion exchange resin is reduced, thereby allowing the occurrence of organic matters due to slime to be reduced and, Still further, in accordance with the concentration of TOC eluted from each portion of the wash water processing apparatus, the TOC concentration adjustment means reduces the TOC concentration of wash water for use in the washing processing part to the value equal to or smaller than the predetermined value usable in the washing processing part by adjustment with discharge of processed water and supply of pure water. Thus, for example, the resultant water can be reused as wash water for use in semiconductor manufacture, liquid-crystal manufacture or electronic components.

From the present invention, the arithmetic expression can compute by using the data table, and thus can quickly perform computation and can rapidly adjust the TOC concentration in the wash water processing apparatus for semiconductor manufacture, liquid-crystal manufacture, and electronic components.

From another aspect of the invention, when a predetermined amount of ozone is continuously supplied from the ozone supply part, the TOC concentration adjustment means performs the discharge of processed water and the supply of pure water in accordance with the amount of discharge of processed water and the amount of supply of pure water found from the arithmetic expression in accordance with the ozone-water concentration and the TOC concentration of processed water so as to reduce the TOC concentration of processed water to be returned to the washing processing part to be a concentration equal to or smaller than the predetermined concentration. Thus, it is possible to clean a product, such as an electronic component or liquid-crystal glass substrate brought into the washing processing part, over a long period of time with pure water having stable water quality, prevent degradation in product quality, and improve yields in manufacture.

Also, by continuously supplying the predetermined amount of ozone, the total supply amount of ozone increases. Thus, for example, processed water which cleans a large-sized process-subject member and contains a large amount of mixture of bacteria and organic matters can be effectively disinfected and purified.

From another aspect of the invention, the arithmetic expression can compute by using the data table, and thus can quickly perform computation and can rapidly adjust the TOC concentration in the wash water processing method for semiconductor manufacture, liquid-crystal manufacture, and electronic components.

DETAILED DESCRIPTION OF EMBODIMENTS OF THE INVENTION

Figure 1:
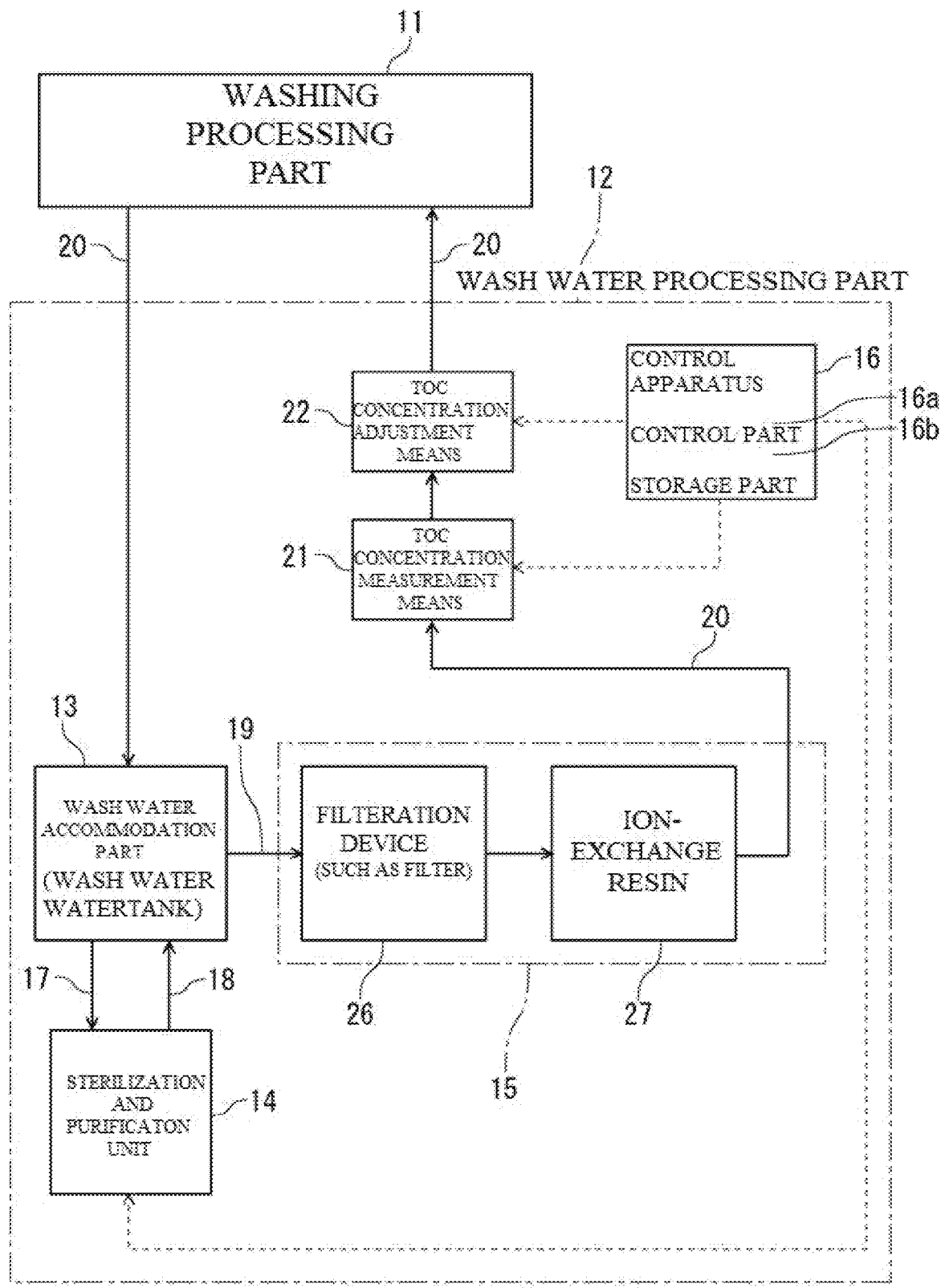
FIG. 1 is a schematic diagram depicting one embodiment of a wash water processing apparatus according to the present invention.

In the following, a wash water processing apparatus and a wash water processing method in the present invention are described in detail based on the drawings. FIG. 1 is a schematic diagram depicting the configuration of one embodiment of the wash water processing apparatus of the present invention.

In FIG. 1, a wash water processing apparatus 12 includes a wash water accommodation part 13, a sterilization and purification unit 14, a filtration mechanism part 15, and a control apparatus 16. The wash water accommodation part 13 and the sterilization and purification unit 14 are connected together by a flow-in flow path 17 and a flow-out flow path 18 so as to allow circulation. The wash water accommodation part 13 and the filtration mechanism part 15 are connected together by a filtration flow path 19. A washing processing part 11 and the wash water accommodation part 13, and the filtration mechanism part 15 and the washing processing part 11 are connected together by a circulation flow path 20. The circulation flow path 20 at the subsequent stage of the filtration mechanism part 15 is provided with TOC concentration measurement means 21 and TOC concentration adjustment means 22.

The wash water accommodation part 13 is a watertank for letting pure water used in a process of cleaning a process-subject member in the washing processing part 11 as processed water flow therein via the circulation flow path 20 for storage. The wash water accommodation part 13 has connected thereto the flow-in flow path 17 and the flow-out flow path 18 provided so as to allow circulation to and from the sterilization and purification unit 14, and the filtration flow path 19 to the filtration mechanism part 15.

The sterilization and purification unit 14 is a unit which performs a process of sterilizing and purifying processed water supplied from the wash water accommodation part 13 by a pump, not depicted, provided inside the unit. Processed water stored in the wash water accommodation part 13 is subjected to the sterilization and purification process, as being circulated between the wash water accommodation part 13 and the sterilization and purification unit 14 via the flow-in flow path 17 and the flow-out flow path 18 connected so as to allow circulation between the sterilization and purification unit 14 and the wash water accommodation part 13. Note that circulation of processed water between the wash water accommodation part 13 and the sterilization and purification unit 14 is performed by a circulating pump, not depicted, provided in the sterilization and purification unit 14.

The sterilization and purification unit 14 includes an ozone supply part which supplies ozone, an ultraviolet ray irradiation part which conducts irradiation with ultraviolet rays, and a photocatalytic action part which acts with photocatalysis. By organically coupling the respective functions, a process of sterilizing and purifying processed water is performed. The sterilization and purification unit 14 is only required to include at least the ozone supply part, and the ultraviolet ray irradiation part and the photocatalytic action part can be omitted as required. In the following, the ozone supply part, the ultraviolet irradiation part, and the photocatalytic action part are briefly described.

The ozone supply part is a portion which supplies ozone to processed water supplied from the wash water accommodation part 13 via the flow-in flow path 17, and includes an ozonizer which generates ozone by taking air as a raw material and an ejector provided in the flow-in flow path 17 to supply and mix ozone into processed water flowing through the inside of the flow path.

The ozonizer has a discharge gap between an earth electrode and a dielectric with a high-voltage electrode laminated thereon, applies high voltage between the earth electrode and the dielectric for discharge, thereby generating ozone in air flowing through the discharge gap. The ejector is formed by taking a resin such as fluororesin, ceramic, or metal as a material, and mixes processed water flowing through the flow-in flow path 17 and ozone (and dissolved oxygen) supplied from the ozonizer to generate a microbubble aqueous mixture (ozone water).

The ultraviolet ray irradiation part and the photocatalytic action part which acts with photocatalysis are integrated as an ultraviolet-ray and photocatalysis unit. The ultraviolet-ray and photocatalysis unit has an ultraviolet light source at a center part, and an inner glass tube for protection is provided on an outer peripheral side of this ultraviolet light source. On an outer peripheral side of the inner glass tube on the outer perimeter of the ultraviolet light source, an outer glass tube having a predetermine inner diameter is provided. Between this outer glass tube and the inner glass tube, a flow path for processed water is formed. Disposed in this flow path is a photocatalyst, which is the photocatalytic action part.

As for the photocatalyst, a peel-resistant photocatalyst formed by oxidizing a surface of a metal titanium base material to generate titanium oxide is used. For example, the photocatalyst is formed by coating a surface side of titanium, a titanium alloy, or the like made of a mesh, a titanium wire, or an aggregate of fibrous titanium materials, as well as a porous titanium material or the like, with titanium dioxide.

With the structure in which the ultraviolet light source is arranged at the center part of the ultraviolet-ray and photocatalysis unit, the entire unit is made compact, and ultraviolet rays are efficiently applied to processed water to sterilize processed water and decompose organic matters, thereby performing sterilization and purification.

The filtration mechanism part 15 is configured of, as depicted in FIG. 1, a filtration device 26 and an ion exchange resin 27. Inside the filtration device 26, a filter such as a hollow fiber membrane filter or an activated carbon filter can be accommodated. To effectively filtrate bacteria contained in processed water and organic matters including dead bacteria, a hollow fiber membrane that is a microfiltration membrane (MF membrane) or an ultrafiltration membrane (UF membrane) is preferably used. And, as a container of the filtration device 26 to contain these hollow fiber membranes, a material such as PVC is often used when the processed water is pure water, and the material such as PVC is used also when processed water is ultrapure water.

Also, the ion exchange resin 27 is used to remove saline components such as calcium, sodium, chloride, and sulfuric acid in processed water that cannot be removed by ozonizing or filtration, a positive ion exchange resin which exchanges a positive ion and a negative ion exchange resin which exchanges a negative ion (minus ion) may be mixed and used. And, as a container for these ion exchange resins, a material such as FRP or a material with stainless steel or iron lined or coated with Teflon (registered trademark) is often used when the processed water is pure water, and this material is used also when processed water is ultrapure water.

The control apparatus 16 is configured of a control part 16a and a storage part 16b. The control part 16a is provided so as to be able to control the ozone supply part of the sterilization and purification unit 14 and the TOC concentration adjustment means 21. In the storage part 16b, an arithmetic expression is stored for calculating supply of processed water to pure water, or drainage of processed water and a supply amount of pure water. In the drawing, broken lines connecting between the control apparatus 16 and the sterilization and purification unit 14, the TOC concentration measurement means 21, and the TOC concentration adjustment means 22 indicate signal transmission routes.

Here, the inventors have confirmed that, in the course of performing research and development of a purification apparatus to be retrofitted to an existing cleaning apparatus which cleans semiconductor manufacture, liquid crystal, and plated electronic components to effectively purify wash water to allow reuse over a long period of time and a purification method, in order to prevent an increase in bacteria at a use point, simply disinfecting and purifying with ozone is insufficient and it is required to supply ozone to the wash water accommodation part.

On the other hand, it has also been confirmed that, if ozone is present in the wash water accommodation part, TOC is eluted from a resin-made impeller of a pump provided in the sterilization and purification unit to circulate processed water, a resin-made filter housing which stores a hollow fiber membrane filter of the filtration device, and a resin-made cylinder which stores ion exchange resin.

From these, when processed water in the wash water accommodation part 13 is disinfected with ozone, in addition to disinfection of treated pure water to a state suitable for reuse, it is required to prevent elution of TOC from each resin-made component due to ozone contained in this treated pure water. For this purpose, while treated processed water is rendered to have an ozone water concentration which allows disinfection to a reusable state, this ozone water concentration is reduced to have a value which allows prevention of TOC elution from each resin-made component.

In the above-described storage part 16b, the arithmetic expression is stored which can calculate a drain amount of processed water and a supply amount of pure water in accordance with the ozone water concentration and the TOC concentration of processed water. By controlling the drain amount of processed water and the supply amount of pure water by the control part 16a based on this arithmetic expression, the ozone water concentration is be made to disinfect treated processed water to a reusable state, and TOC elution from the resin-made components can be reduced.

To set the arithmetic expression in the storage part 16b, as described above, it is required to set an ozone water concentration which allows disinfection of treated processed water to a reusable state and also set a value which allows reduction in TOC concentration. In this case, while the capability of disinfecting processed water is enhanced to maximum, the influence on the resin-made components such as the filtration mechanism part 15 is reduced to minimum, thereby maintaining its functionality.

To obtain treated water having an ozone water concentration with the disinfection capability as described above enhanced to maximum, it is required to clarify the influence of a difference in ozone water concentration on, in addition to the wash water accommodation part 13, the filter and the ion exchange resin 27 in the wash water processing apparatus 12, each of the resin components such as an FRP cylinder and a filter housing for filling these, the impeller of the pump, and an O ring, and so forth. Thus, for each of the filtration device 26 and the ion exchange resin 27, a degradation test with ozone water was performed. In the degradation tests, by changing the ozone water concentration or contact time with ozone, conditions for degradation of the filtration device 26 and the ion exchange resin 27 were checked, and a relationship in oxidation degradation was checked between the ozone water concentration and the filtration device 26 and the ion exchange resin 27.

In that case, by setting an ozone generation amount (g/h) per hour, a desired ozone water concentration (mg/L) can be obtained. The applicant estimated 2.0 g/h as an ozone generation amount for obtaining an optimum ozone water concentration and performed a test with an ozone water concentration of 5.37 mg/L in this case, thereby reducing the concentration of residual ozone water after ozone is treated by the ozone supply part to a value smaller than 5.37 mg/L. Also, as comparison with this, tests were performed in the case of an ozone generation amount of 0.3 g/h (ozone water concentration of 1.31 mg/L) and in the case of an ozone generation amount larger than 2.0 g/h (ozone water concentration of 5.37 mg/L). Note that subject water here was pure water in all cases and ion exchange water was used.

Figure 2:
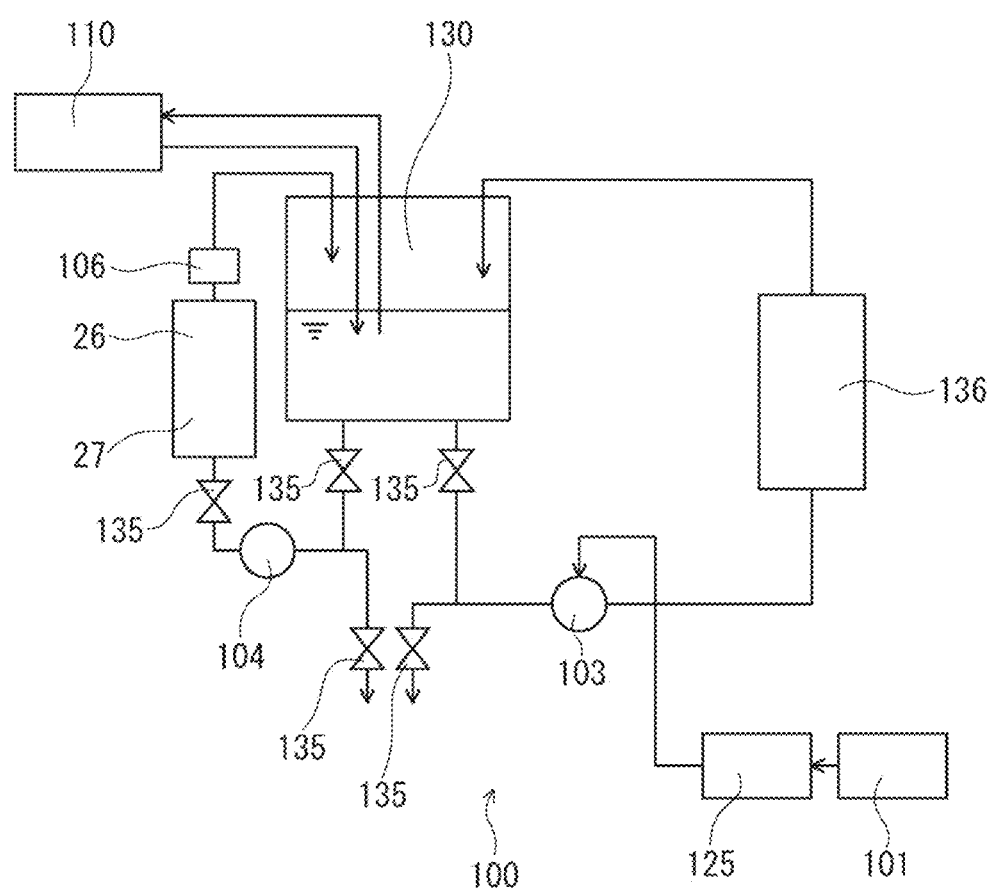
FIG. 2 is a block diagram depicting a degradation test apparatus of an ion-exchange-resin/filtration device.

By using a test apparatus 100 depicted in FIG. 2, conditions for degradation of the ion exchange resin 27 and the filtration device (filter) 26 are confirmed, and a relationship in oxidation degradation is clarified between these and of the ozone water concentration.

In the drawing, with a PSA (oxygen concentrator) 101 being taken as a gas material generator, this PSA was connected to an ozonize 125 (Masuda Research, Inc., ozone generator OZS-EP3-20), and ozone gas generated by this ozonizer 125 was pressurized and dissolved by a mixing pump 103 (Nikuni Co., Ltd., M20NPD04Z) to generate high-concentration ozone water.

Ozone water generated by an ozone generating part 136 which generates ozone is accumulated in a watertank 130, and this ozone water is delivered via a water supply pump 104 to the ion exchange resin 27 or the filtration device (filter) 26. To the ion exchange resin 27 or the filtration device 26, waterflow was made after being adjusted by a flowmeter 106 and an adjustment valve 135 provided in a route so as to have an appropriate flow rate.

The concentration of ozone water accumulated in the test watertank 130 was measured as occasion arises by an ozone-water concentration meter 110 (Okitorotec Co., Ltd., ozone-water concentration meter, OZM-7000LN).

While one set of the filter 26/the ion exchange resin 27 is provided in series with respect to the flow path in FIG. 2, a plurality of filters/ion exchange resins may be provided in parallel.

In a degradation test on the ion exchange resin 27 with ozone water, an ion exchange resin AMBERLITE MB2 manufactured by Organo Corporation was used, and a PVC container filled with the ion exchange resin 27 was used.

In the degradation test on the ion exchange resin 27 by the test apparatus 100, the test apparatus 100 was operated for thirty minutes for ion exchange water retained in the test watertank 130 to measure an ozone water concentration. Then, the water supply pump 104 was operated to provide a waterflow of ozone water to the ion exchange resin 27 at a predetermined concentration for a predetermined time. The ion exchange resin 27 after the waterflow of ozone water was subjected to various analyses to check the degree of degradation.

Figure 3:
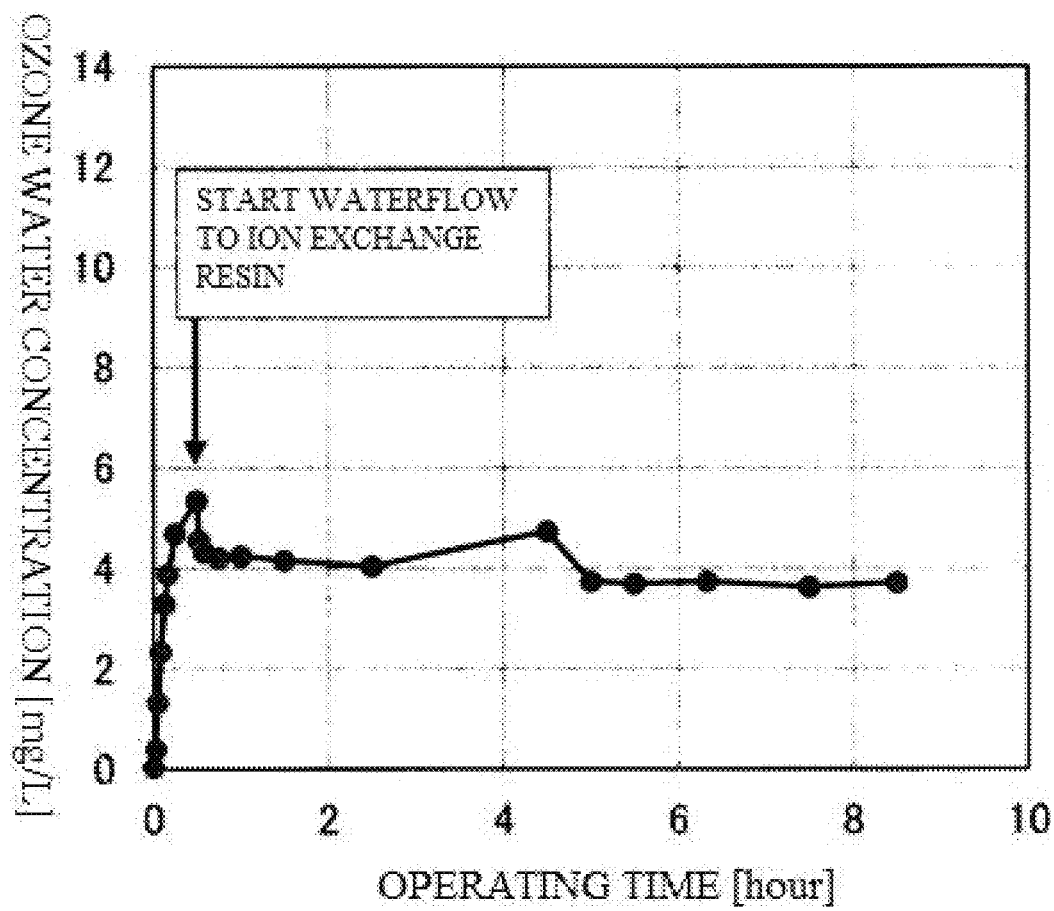
FIG. 3 is a graph depicting changes in concentration of an initial ozone water concentration of 5.37 mg/L.
Figure 4:
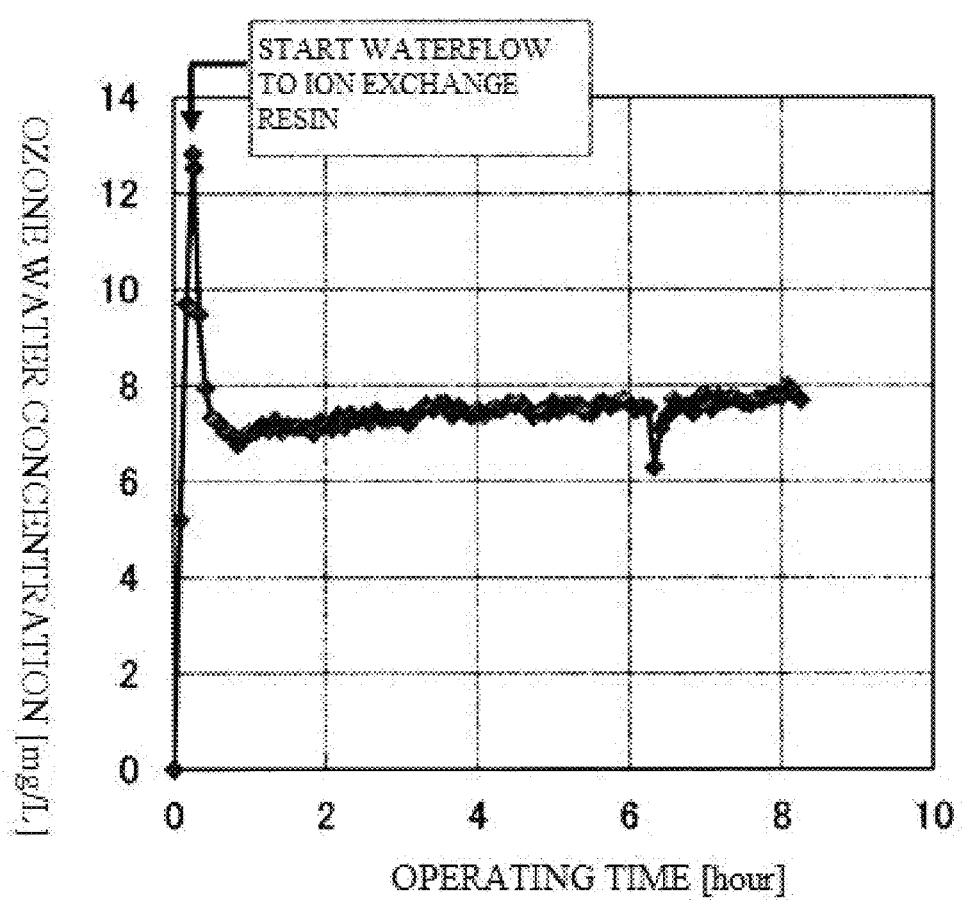
FIG. 4 is a graph depicting changes in concentration of an initial ozone water concentration of 12.5 mg/L.

Various conditions at the time of the implementation of the above-described test are as follows.
PSA supply gas flow rate: 2.5 to 2.7 L/min
PSA supply gas pressure: 0.078 to 0.081 MPa
Mixing pump discharge pressure: 0.29 to 0.33 MPa
Ozonizer flow rate: 1.6 to 1.7 L/min
Quantity of water: 70 L
Waterflow time: 8 hours, 72 hours Transitions (changes) of the ozone water concentration when tests are performed the above-described test apparatus 100 are depicted in graphs of FIG. 3 and FIG. 4. Depicted in FIG. 3 are changes in ozone water concentration with respect to operating time with the ozone water concentration is tried to be set near 5.37 mg/L, and depicted in FIG. 4 are changes in ozone water concentration with respect to operating time when the ozone water concentration is tried to be set larger than 5.37 mg/L. In both of any graphs of FIG. 3 and FIG. 4, waterflow to the ion exchange resin 27 starts at a time indicated by an arrow.

In the case of FIG. 3, the ozone water concentration is 5.37 mg/L when test water passing the ozonizer (ozone supply part) 125 to be accumulated in the test watertank 130 starts flowing to the ion exchange resin 27. After waterflow to the ion exchange resin 27, this ion exchange resin 27 reacts with ozone, and thus the ozone water concentration decreases and the average ozone water concentration in the waterflow test is 4.07 mg/L. In this manner, after waterflow to the ion exchange resin 27, the influence by this reaction of the ion exchange resin 27 and ozone increases. Thus, a definition at the time of setting an ozone water concentration is set so as to satisfy that the concentration of residual ozone water after treatment by the ozonizer 125 is reduced to be smaller than 5.37 mg/L.

On the other hand, in the case of FIG. 4, the ozone water concentration in an early stage of waterflow is approximately 12.5 mg/L. Immediately after the start of waterflow to the ion exchange resin 27, the ion exchange resin 27 reacts with ozone as described above, and thus the ozone water concentration decreases. Although increasing or decreasing to some extent depending on changes in water temperature and waterflow time, the ozone water concentration makes transitions between approximately 6 to 9 mg/L, and the average ozone water concentration after waterflow to the ion exchange resin 27 is 7.44 mg/L.

In this case, in any state after a lapse of predetermined operating time (eight hours) from the early stage of waterflow, the ozone water concentration is not below 5.37 mg/L, which does not meet the condition of the ozone water concentration in the test of FIG. 3.

The analysis results of the ion exchange resin 27 by the above-described tests are described below.

As for the influence the ion exchange resin receives by ozone, when the ion exchange resin is oxidized by ozone, it is assumed that a functional group becomes disconnected or the matrix of the resin is oxidized to expand. Thus, as analysis items for grasping degradation, "total exchange capacity", "neutral salt splitting capacity", and "moisture-retaining power" were measured.

Note that the ion exchange resin used for the tests is a mixed resin with a positive ion exchange resin and a negative ion exchange resin being uniformly mixed. At the time of analysis, each ion exchange resin was separated, and various numerical values were measured.

Broadly, two separate tests were performed. Depicted in Table 1 are the results of analyzing the ion exchange resin when a test was performed with the ozone water concentration in the early stage of waterflow of 1.31 mg/L and 5.37 mg/L. To depict the performance of the ion exchange resin in a state in which ozone water is not let flow, Table 1 has reference values for generally-recommended performance.

Note that since the ion exchange resin reacts with ozone after waterflow of ozone water to the ion exchanger resin even when the ozone water concentration in the early stage of waterflow is 1.31 mg/L, the ozone water concentration decreased and the average ozone water concentration during the waterflow test was 0.68 mg/L.

TABLE 1

|   |   | TEST 1A | | TEST 1B | |
|---|---|---|---|---|---|
| OZON WATER CONCENTRATION IN EARLY STAGE OF WATERFLOW (mg/L) | REFERENCE VALUE 1 | 1.31 | | 5.37 | |
| AVERAGE VALUE OF OZONE WATER CONCENTRATION DURING WATERFLOW (mg/L) | | 0.68 | | 4.07 | |
| WATERFLOW HOURS (HOUR) | | 8 | | 8 | |
|   | A | B | A | B | A | B |
| NEUTRAL SALT SPLITTING CAPACITY (mg EQUIVALENT AMOUNT/mg RESIN) | ≥1.8 | ≥0.7 | 2.06 | 0.76 | 2.10 | 0.68 |
| TOTAL EXCHANGE CAPACITY (mg EQUIVALENT AMOUNT/mg RESIN) | — | — | — | 1.35 | — | 1.32 |
| MOISTURE-RETAINING POWER (%) | 44-48 | 45-51 | 45.2 | 46.7 | 43.1 | 46.0 |

A: POSITIVE ION EXCHANGE RESIN
B: NEGATIVE ION EXCHANGE RESIN

In Table 1, when reference values 1 and analysis values of tests 1A and 1B are compared, under the concentration with an ozone water concentration being smaller than 5.37 mg/L, a reaction of the ion exchange resin and ozone water has been acknowledged. However, regarding each of neutral salt splitting capacity and moisture-retaining power, clear degradation was not observed, compared with the reference values, for any of the positive ion exchange resin and the negative ion exchange resin in both of the tests 1A and 1B, and practical functionality as an ion exchange resin was kept.

On the other hand, the analysis results when the ozone water concentration in equal to or larger than 5.37 mg/L are depicted in Table 2. Table 2 has generally-recommended reference values and various measurement values of the ion exchange resin in a state of "no waterflow" in which ozone water is not let flow and when the ozone water concentration is equal to or larger than 5.37 mg/L (the concentration in the early stage of waterflow is 12.5 mg/L) and when the waterflow hours are eight hours and seventy-two hours.

TABLE 2

|   |   | | TEST 2A | | TEST 2B | |
|---|---|---|---|---|---|---|
| OZON WATER CONCENTRATION IN EARLY STAGE OF WATERFLOW (mg/L) | REFERENCE VALUE 2 | | 0 | | 12.5 | | 12.5 |
| AVERAGE VALUE OF OZONE WATER CONCENTRATION DURING WATERFLOW (mg/L) | | | NO (WATERFLOW) | | 7.5 | | 9.5 |
| WATERFLOW HOURS (HOUR) | | | 0 | | 8 | | 72 |
|   | | A | B | A | B | A | B |
| NEUTRAL SALT SPLITTING CAPACITY (mg | (≥2.0) | — | 2.05 | 1.24 | 2.06 | 0.76 | 2.10 | 0.68 |

TABLE 2-continued

| EQUIVALENT AMOUNT/mg RESIN) | | | | | | | | |
|---|---|---|---|---|---|---|---|---|
| TOTAL EXCHANGE CAPACITY (mg EQUIVALENT AMOUNT/mg RESIN) | ≥2.0 | ≥1.3 | — | 1.39 | — | 1.35 | — | 1.32 |
| MOISTURE-RETAINING POWER (%) | 44-48 | 45-51 | 46.0 | 47.9 | 49.6 | 48.4 | 61.8 | 49.6 |

In a test 2A in Table 2 (ozone water concentration in the early stage of waterflow: 12.5 mg/L; ozone water concentration during waterflow: 7.5 mg/L; and waterflow hours: eight hours), it has been confirmed that a positive ion exchange resin A was below the reference value of the neutral salt splitting capacity and the ion exchange power was degraded. On the other hand, it has been confirmed that the moisture-retaining power was above the upper limit of the reference value and the resin swelled due to the oxidation effect of ozone to be degraded.

Furthermore, when the waterflow hours extend to seventy-two hours (test 2B), it can be found that the total exchange capacity of the negative ion exchange resin B was below the reference value and degradation of the ion exchange resin proceeded.

From these, it can be found that the ion exchange power decreases as the waterflow hours of ozone water are prolonged. Under the conditions of the present test, it can be said that a determination can be made whether the ion exchange resin has been degraded in comparison with the reference values in a state of eight hours of waterflow.

Also, in the present test, the particle diameter of the ion exchange resin after waterflow of ozone water was measured and observed by a microscope, and a TOC elution amount was checked. In particular, in the negative ion exchange resin, it has been confirmed that as the waterflow hours of ozone water were prolonged, a physical crush occurred to decrease the particle diameter. Also, it has been confirmed that as the waterflow hours were prolonged, the TOC concentration during the waterflow test increased. The reason for this is thought to be that high-polymer organic matters configuring the ion exchange resin are oxidized by ozone and the shape of the resin structure itself cannot be kept, which means that elusion of the organic matters as materials has occurred.

From these, when ozone water as an oxidant is let flow to the ion exchange resin with an ozone water concentration of 7.5 mg/L for eight hours or longer, there are concerns for degradation in ion exchange power and elusion of organic matters. Thus, in practice, it can be thought to be difficult to use the ion exchange resin in this ozone water.

From above, according to the results in Table 1, when the ozone water concentration is smaller than 5.37 mg/L, while the sterilization effect on the ion exchange resin included in the filtration mechanism part is kept, degradation can be inhibited without inhibiting the function and, in turn, the frequency of replacement of the ion exchange resin can be decreased to prolong the life of the apparatus.

Next, a degradation test on the filtration device 26 (filter) by the test apparatus 100 of FIG. 2 is performed.

High-concentration ozone water generated with pure water by the test apparatus 100 was fed, while its concentration was kept constant, to the filter 26, and the situation of progress of degradation of the filter 26 when the contact time is changed was checked.

The filter used for the test was made by Nihon Filter Co., Ltd., and the one with a housing type NPH-NPP-10 and a filter model CW-1 (material of polypropylene) was used.

The procedure of the degradation test on the filtration device 26 by the test apparatus 100 is similar to the procedure of the degradation test on the ion exchange resin described in [0061], and the surface of the filter after waterflow of ozone water was observed by a microscope.

Various conditions at the time of the implementation of the above-described test are as follows.
PSA supply gas flow rate: 2.5 to 2.9 L/min
PSA supply gas pressure: 0.078 to 0.085 MPa
Mixing pump discharge pressure: 0.3 MPa
Ozonizer flow rate: 1.6 L/min
Quantity of water: 70 L
Waterflow time: 8 hours, 24 hours For each filter of the filter device 26 after the above-described test, optical observation and SEM observation are each performed by the microscope.

Conditions at the time of observation are as follows.
Analyzer:
  Optical observation: Digital microscope (Keyence VHX-1000)
  SEM observation: Electron microanalyzer (Shimadzu EPMA-1610)
Analysis Method:
  After optical observation on the filter surface is performed, gold vapor deposition (ion sputtering) is performed, and SEM observation is performed.

Figure 5:
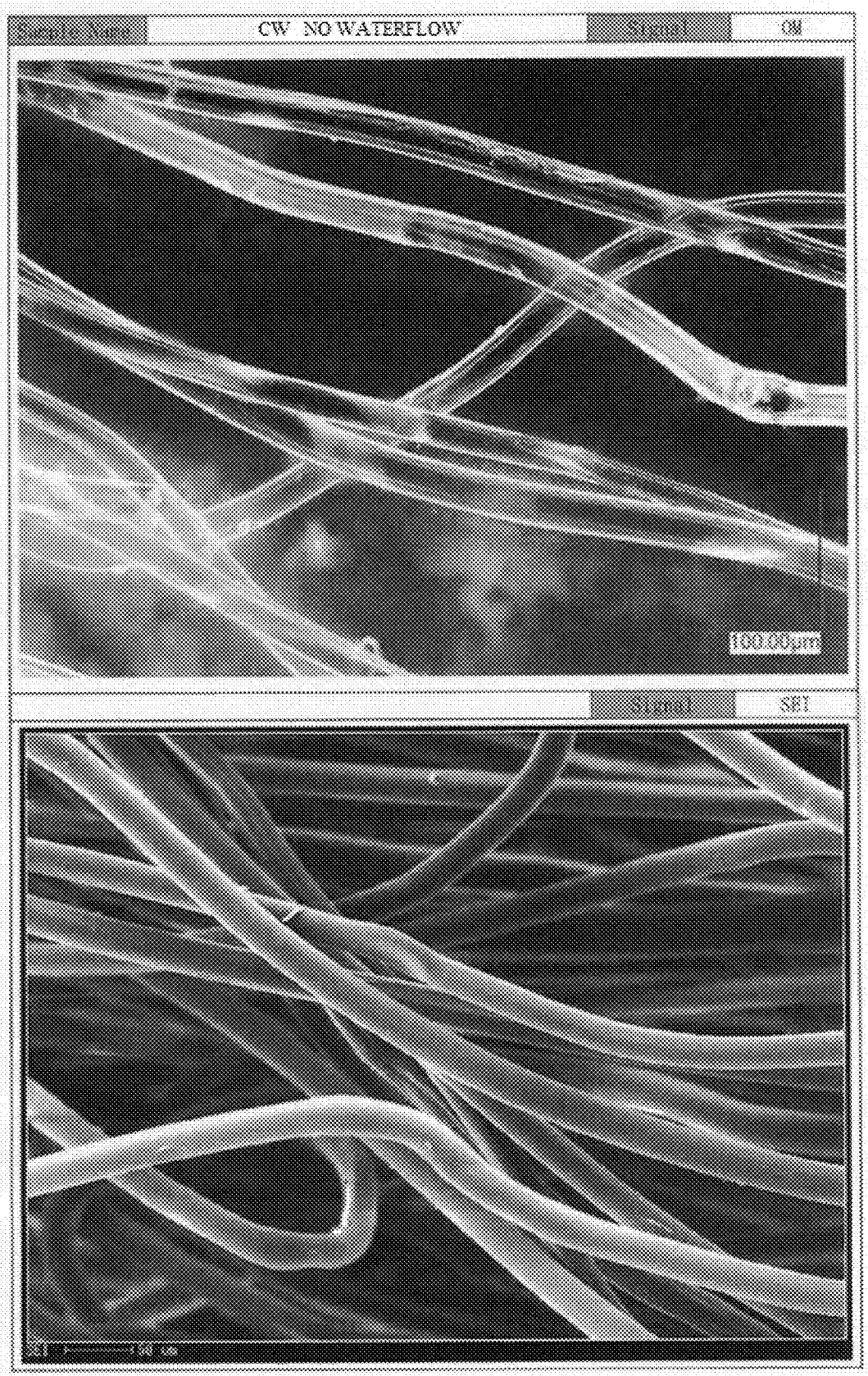
FIG. 5 is a microphotograph of a filter with an ozone water concentration of 0 mg/L.
Figure 6:
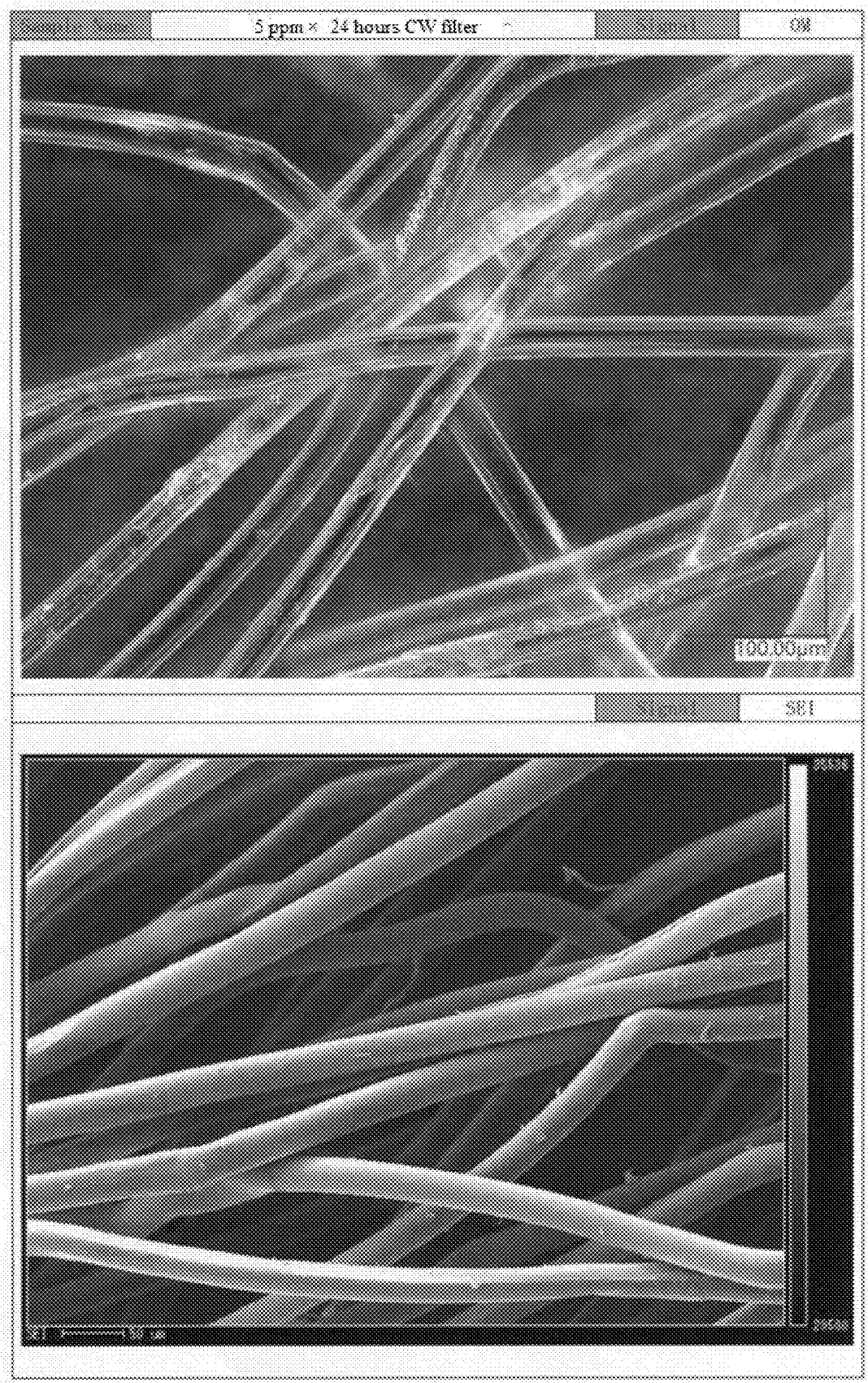
FIG. 6 is a microphotograph of a filter with an ozone water concentration of 5.5 mg/L.
Figure 7:
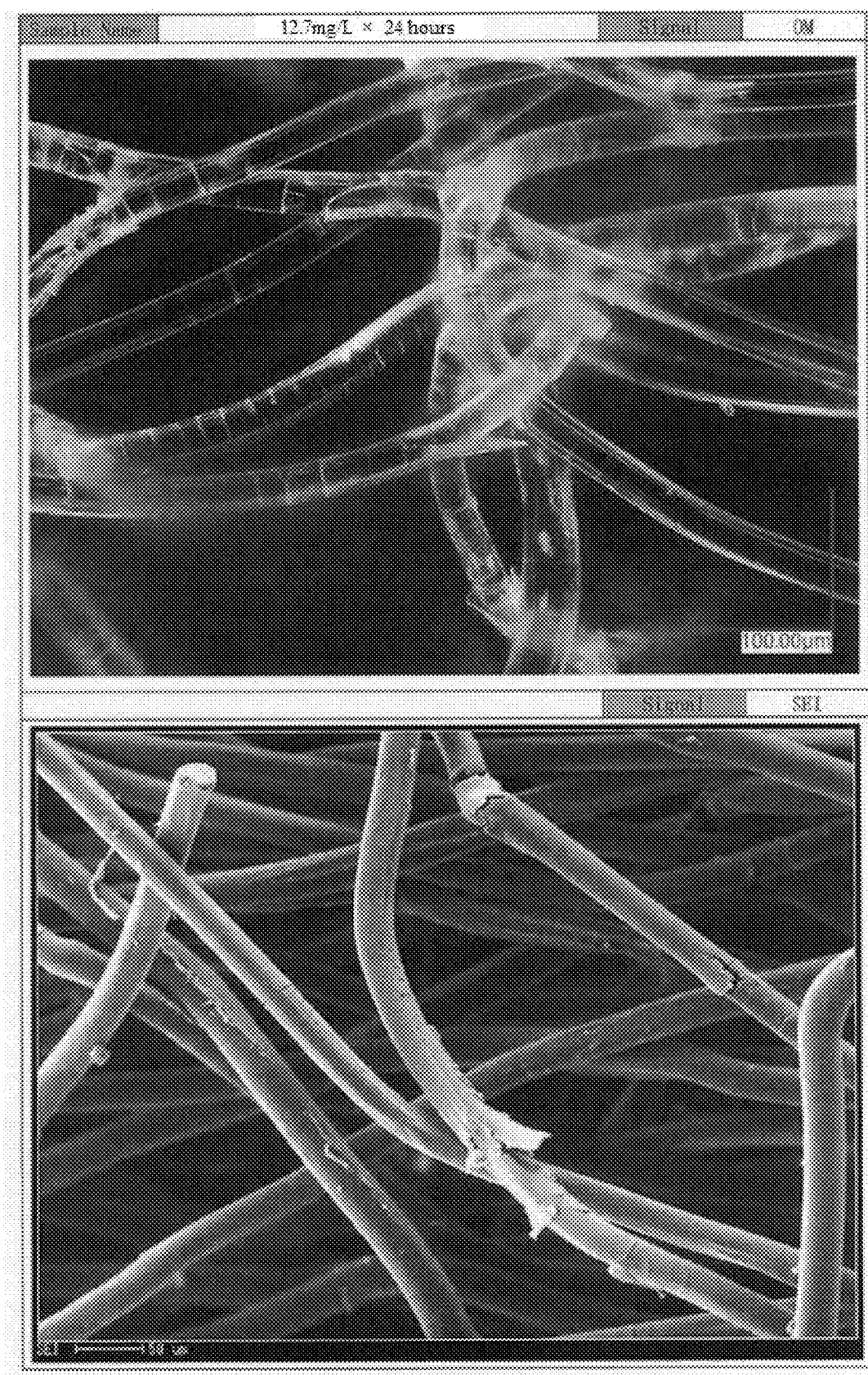
FIG. 7 is a microphotograph of a filter with an ozone water concentration of 12.7 mg/L.

Photographs obtained from the above-described test by microscopic observation on the filter (model CW-1) of the filtration device are depicted in FIG. 5 to FIG. 7. In each drawing, a photograph obtained by the microscope is depicted above and a SEM photograph obtained by and electron microscope is depicted below. FIG. 5 depicts a state in which the waterflow hour is 0 hour (no load by ozone water), FIG. 6 depicts a state in which the average ozone water concentration during waterflow is 5.5 mg/L and after twenty-four hours of waterflow, and FIG. 7 depicts a state of the filter when the average ozone water concentration during waterflow is 12.7 mg/L and after twenty-four hours of waterflow.

From the results of observation on the photographs from FIG. 5 to FIG. 7, it has been confirmed that, in particular, from the electron micrograph (SEM images) depicted below, as the ozone water concentration increases, tears of the fiber surface and attachment of fragments of teared fiber onto the surface increase and degradation of the high-polymer resin by ozone proceeds.

FIG. 6 depicts the case when the ozone water concentration is 5.5 mg/L (equivalent to an ozone water concentration of 5.37 mg/L) at the time of waterflow. Compared with the photograph of FIG. 5 without load by ozone water, large degradation is not confirmed. With the extent of the ozone water concentration of 5.5 mg/L (equivalent to 5.37 mg/L), it can be determined that degradation to the extent that the performance of the filter is impaired does not occur. On the other hand, in the case of waterflow with an ozone water concentration exceeding 5.37 mg/L to 12.7 mg/L, clear degradation of the filter surface as in FIG. 7 has been confirmed.

From these, in the above-described degradation tests on the filtration device, if the ozone water concentration is smaller than 5.5 mg/L, degradation to the extent that the performance of the filter is impaired does not occur. Conversely, by residual ozone in processed water, the sterilization effect of the filtration device (filter) configuring the filtration mechanism part sufficiently acts to be able to prevent slime in the filter, keep the performance of the filtration device (filter) and, in turn, decrease the frequency of replacement of the filter and prolong the life of the apparatus.

From these, in the case of single use of the filtration device (filter), if the ozone water concentration is smaller than 5.5 mg/L, degradation can be prevented without impairing the function while the sterilization effect is kept. However, in view of the entire filtration mechanism part configured of the filtration device (filter) and the ion exchange resin, if the ozone water concentration is smaller than 5.37 mg/L, which has been confirmed in the degradation tests on the ion exchange resin, degradation can be prevented without impairing the function while the sterilization effect is kept for the entire filtration mechanism part and, in turn, the frequency of replacement of the filtration membrane and the ion exchange resin can be decreased and the life of the apparatus can be prolonged.

Figure 8:
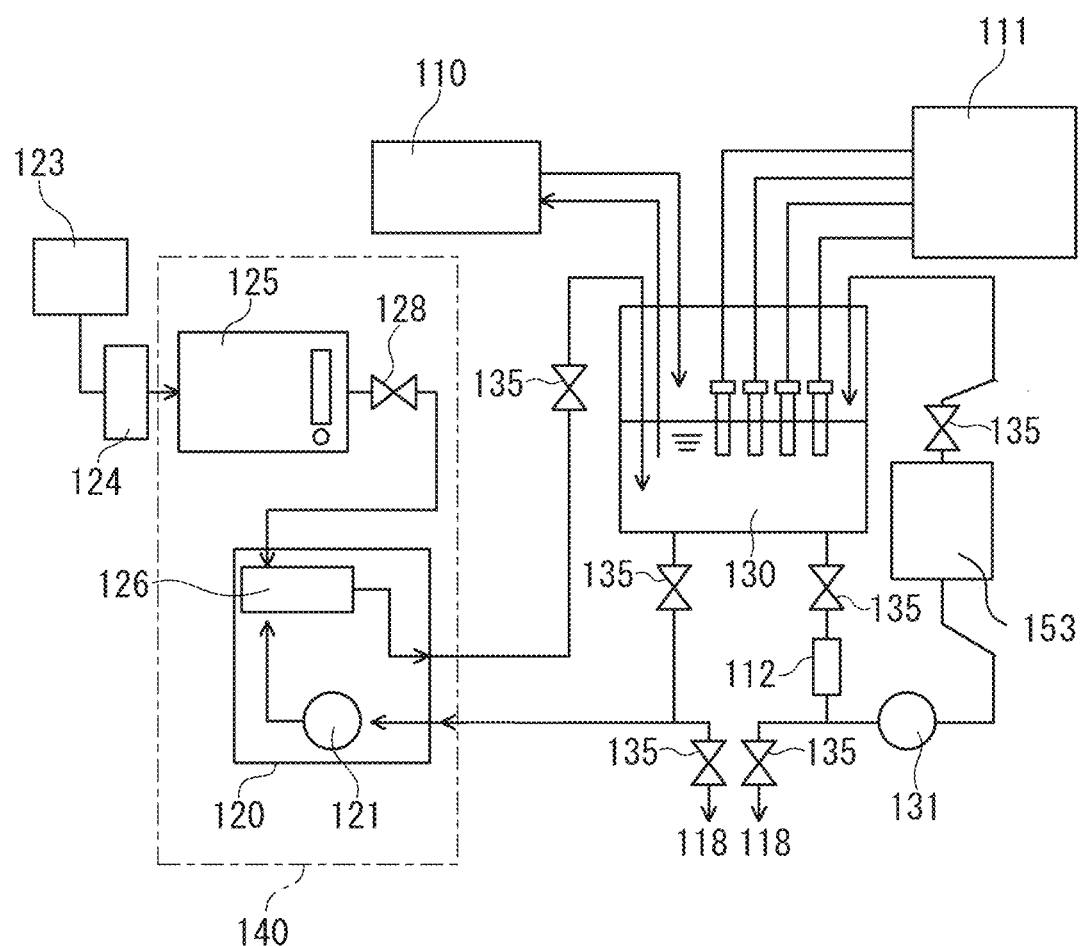
FIG. 8 is a block diagram of a TOC elution test.
Figure 9:
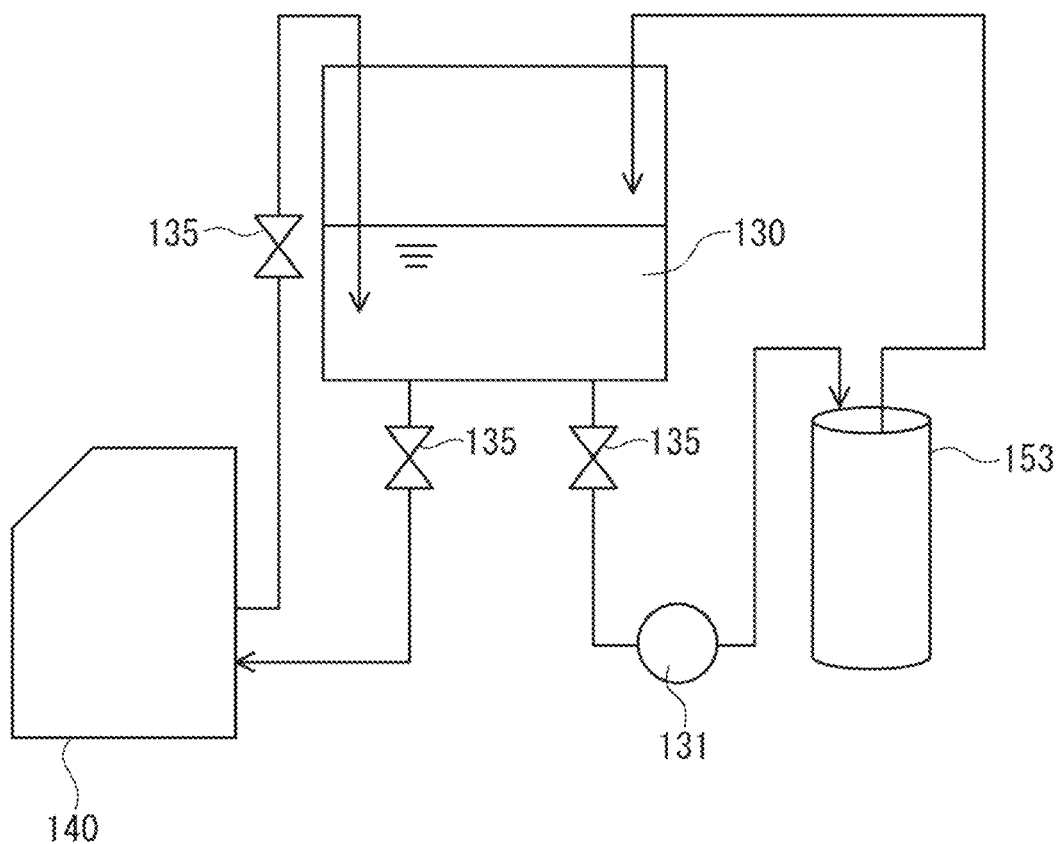
FIG. 9 is a block diagram of a partially-omitted TOC elution test.

Next, a test for clarifying a relation between the ozone water concentration and the TOC concentration was performed. FIG. 8 and FIG. 9 each depicts a schematic block diagram for testing a TOC elution state to the apparatus by ozonizing, and portions identical to those in the above-described test apparatus are represented by the same reference numerals. Pieces of equipment used for the test are a test apparatus 120 (Pureculaser (registered trademark) ZPVS3U11), an ozonizer 125 (Masuda Research Inc., ozone generation apparatus, OZS-EP3-20), and an ozone-water concentration meter 110 (Okitorotec Co., Ltd., ozone-water concentration meter, OZM-7000LN). Note in the drawing that 111 denotes a sensor BOX, which measures pH, ORP, water temperature, and electrical conductivity. Also, 112 denotes a flowmeter, and 118 denotes drainage. Furthermore, 121 denotes a circulation pump, which is incorporated in the test apparatus 120. Still further, 123 denotes a compressor (air compressor), 124 denotes a flowmeter, and 128 denotes a flow control valve. Still further, 130 denotes a test watertank, and 135 denotes a valve.

In a test method, as a test of waterflow to an FRP-made cylinder 153, the concentration of ozone water to be introduced to a test apparatus 140 was changed to three types, and the test apparatus 140 was operated for thirty minutes for ion exchange water (pure water) to make an adjustment to a predetermined concentration. For ozone water with the ozone water concentration adjusted by the ozonizer 125 and an ejector 126 to three types (ozone generation amounts are 0.5 g/h, 1.0 g/h, and 2.0 g/h), a water supply pump 131 was operated to let ozone water flow to the FRP cylinder 153 for eight hours. Note that as the FRP cylinder 153 used in this test, a container having stored therein an ion exchange resin (cartridge demineralizer AMBERLITE MB2 manufactured by Organo Corporation, capacity of 5 L) was used (no ion exchange resin is stored).

Its test conditions are as follows.
[Test Conditions]

| Test water | ion exchange water |
|---|---|
| Test water amount | 40 L |
| Circulation flow rate | 20 L/min (120 seconds for one turn) |
| Ozone generation amount | 0.5 g/h |
| | 1.0 g/h |
| | 2.0 g/h |

Figure 10:
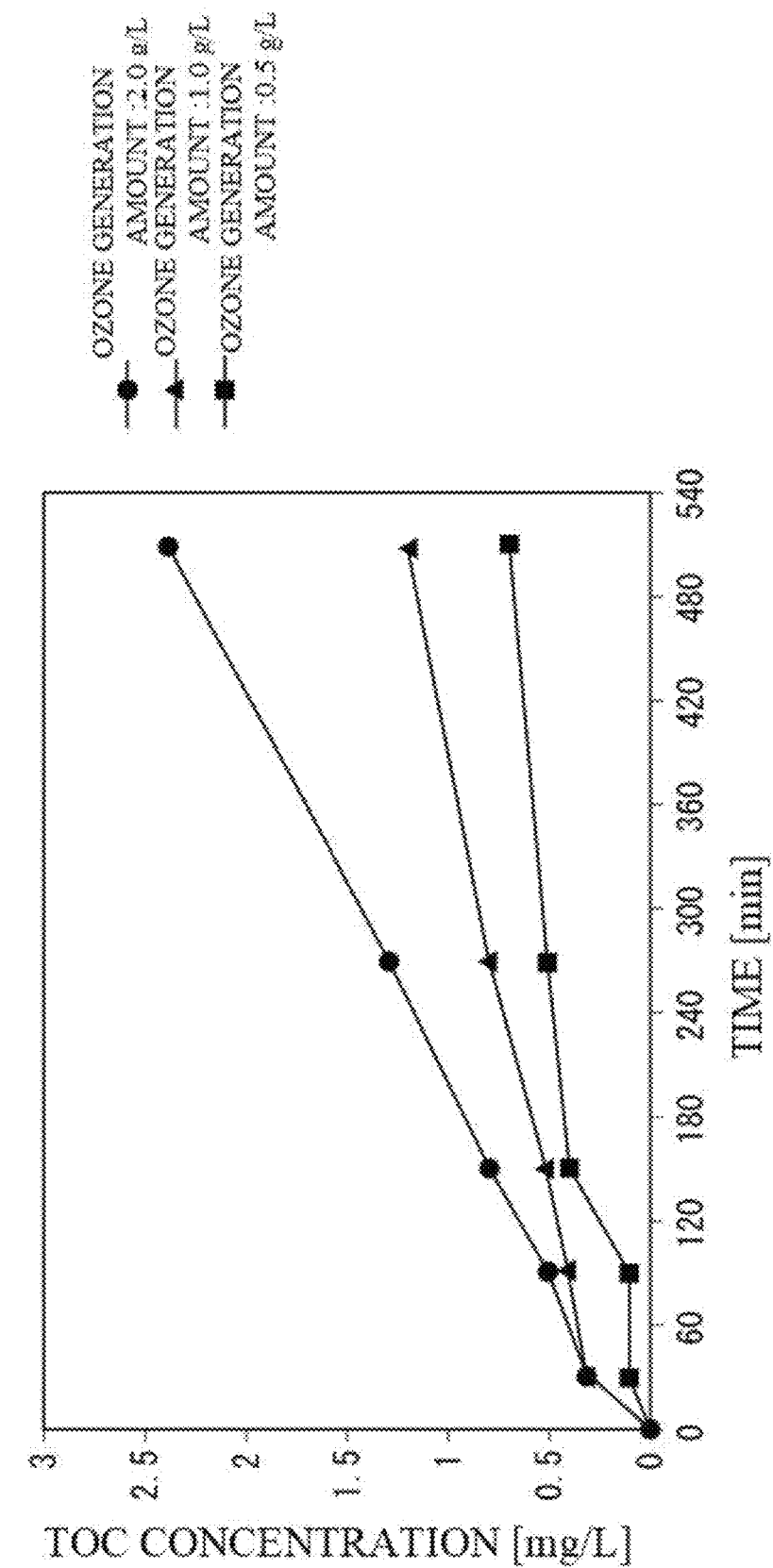
FIG. 10 is a graph indicating TOC concentration measurement values per hour when the ozone generation amount is changed.

As a result of the experiment performed by the inventors, as depicted in FIG. 10, it has been confirmed that the TOC amount eluted from the resin-made members in contact with ozone water linearly increases substantially in proportion to the concentration of ozone water in accordance with the ozone generation amount and the time of contact between ozone water and the resin-made members. When the results of this experiment are organized for each contact time as depicted in FIG. 11, it is possible to organize relations between the ozone water concentration (mg/L) and the eluted TOC concentration (mg/L) for each ozone contact time.

Figure 11:
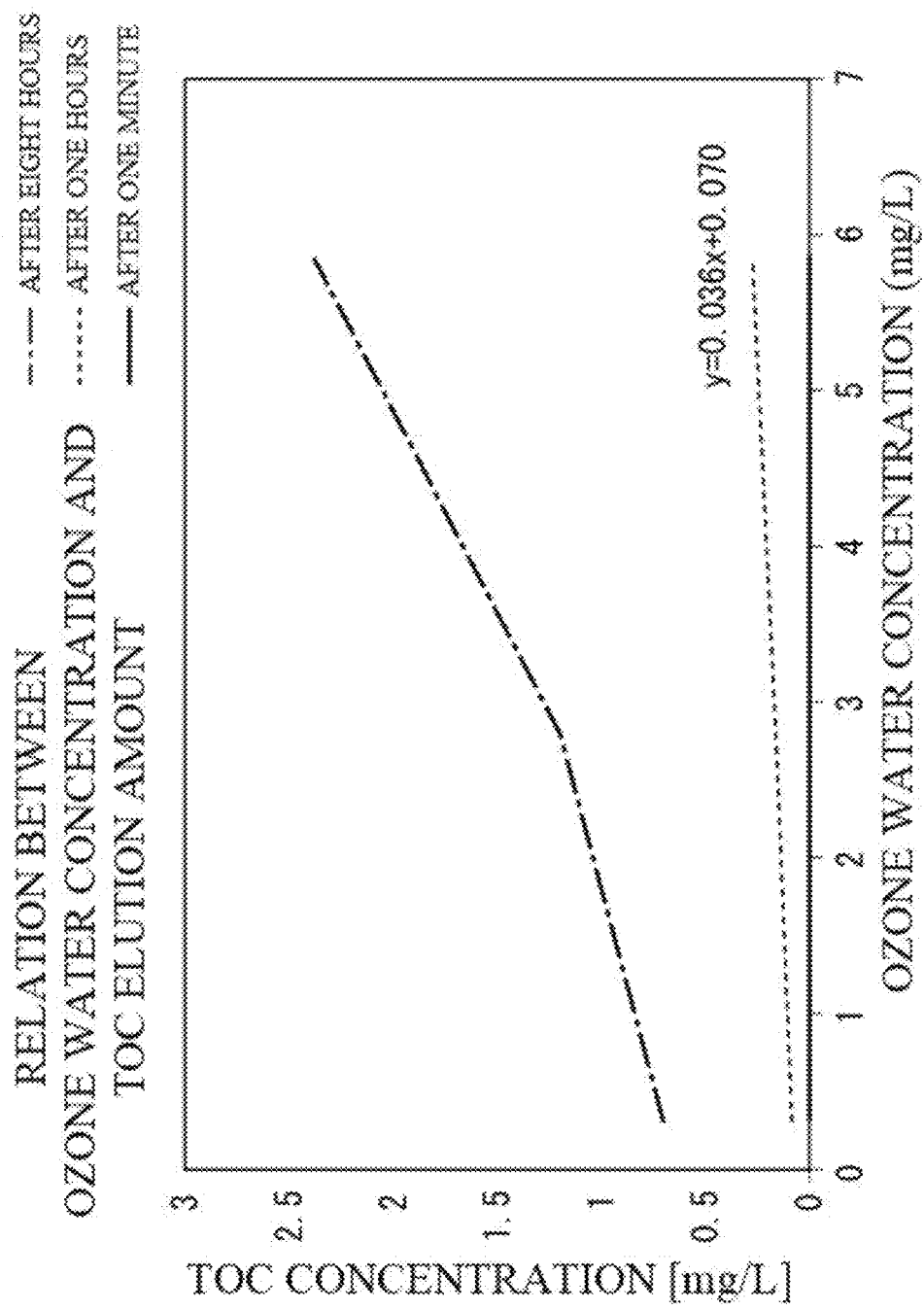
FIG. 11 is a graph indicating a relation between the ozone-water concentration and the TOC elution amount.

In FIG. 11, the relation between the ozone water concentration (mg/L) and the eluted TOC concentration (mg/L) when the time of contact between ozone water and the resin-made members is one hour is substantially linear. Thus, the relation with the eluted TOC concentration (mg/L) when ozone water and the resin-made members are brought into contact together per unit time can be approximated by the following equation, when the ozone water concentration is x (mg/L) and the eluted TOC concentration is y (mg/L).

(Equation 1)

$$y=0.0036x+0.070 \qquad (1)$$

Also, to investigate changes in ozone supply time and ozone water concentration, an experiment was performed by setting three ozone supply amounts as 0.5 (g/h), 1.0 (g/h), and 2.0 (g/h) and measuring changes in ozone supply time (min) and ozone water concentration (mg/L) for each ozone supply amount. For each ozone supply amount, a change in ozone water concentration (mg/L) with respect to the ozone supply time (min) was measured and, based on this measurement result, third-order approximation was performed on a relation between an ozone generation time (min) and the ozone water concentration x (mg/L) to obtain a curve, which is depicted in FIG. 12.

Figure 12:
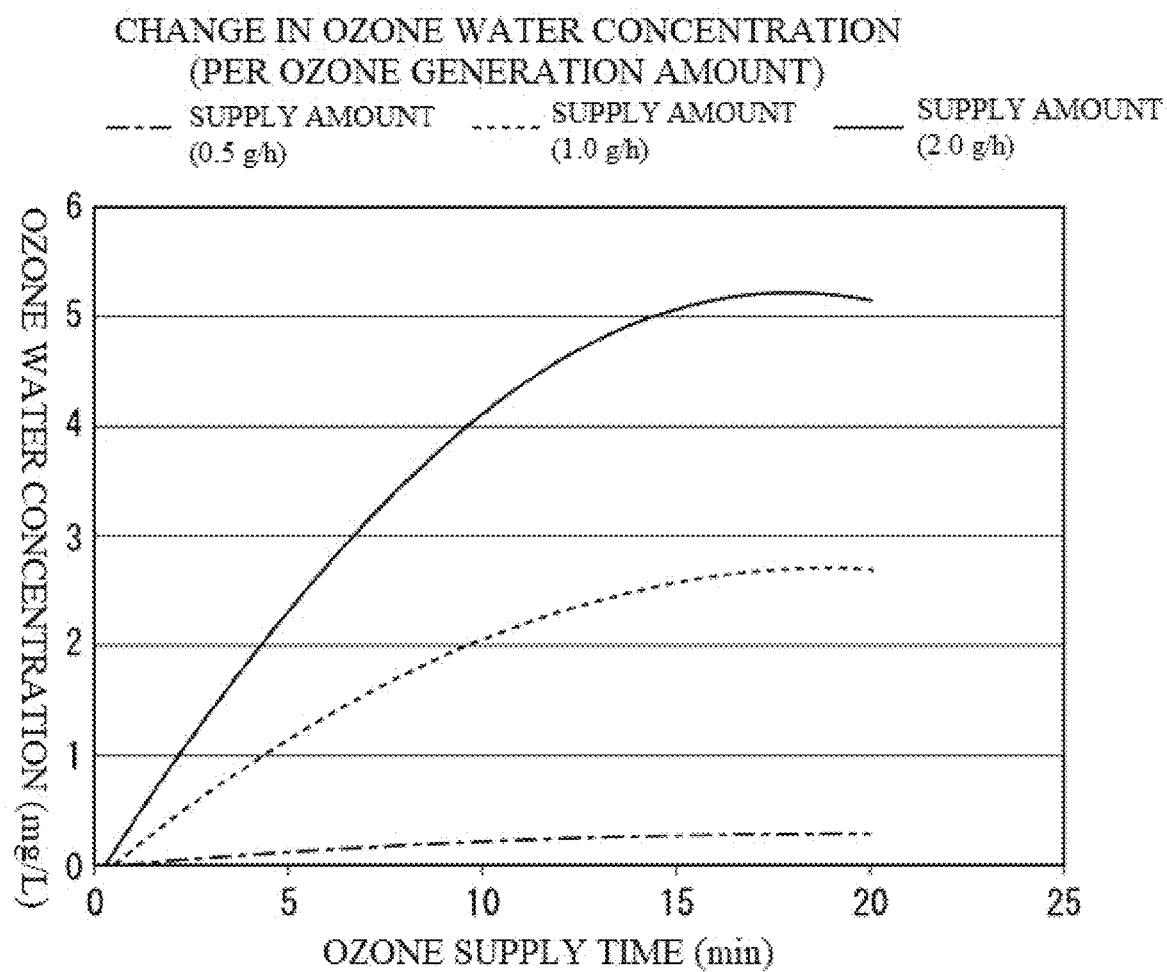
FIG. 12 is a graph indicating ozone supply amounts and ozone-water concentration measurement values.

From the gradient of the tangent at the time of rising of the third-order approximation curve depicted in this FIG. 12, it is possible to find a rate of increase of the ozone water concentration for each ozone supply amount. Also, the rate of increase of the ozone water concentration when the ozone supply amount is other than these three amounts can be found by linear interpolation from the rate of increase of the ozone water concentration per each of three unit times, and can be found also from the actual measurement results by performing actual measurements with the ozone supply amount being more finely changed. Note that, as depicted in the drawing, the rate of increase of the ozone water concentration can be linearly approximated with high accuracy until the ozone supply time is ten minutes or so. Also, it has been confirmed that, irrespective of the ozone supply amount, there is an upper limit for the increase in ozone water concentration even if ozone supply continues.

In addition to these, an experiment was performed in which changes in ozone water concentration was checked when intermittent operation of repeating ozone supply/stop was conducted. In the experiment, with the ozone supply amount being 2.0 (g/h), changes in ozone water concentration were measured in the cases in which ozone supply for one minute and ozone stop for nine minutes were repeated, ozone supply for five minutes and ozone stop for five minutes were repeated, and ozone supply for thirty minutes was performed and then ozone stop for thirty minutes was performed.

Figure 13:
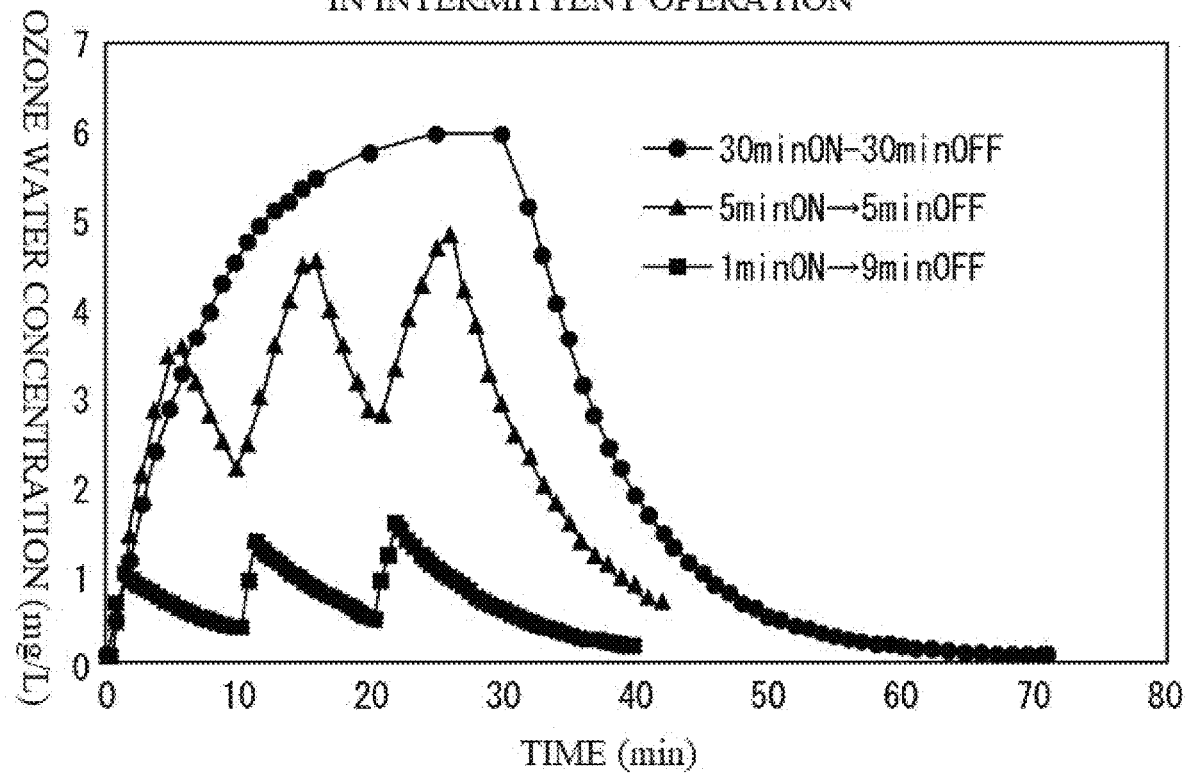
FIG. 13 is a graph indicating changes in ozone-water concentration in intermittent operation of repeating ozone supply/stop.

The measurement results are as depicted in FIG. 13. In any case, the ozone water concentration substantially linearly increases immediately after the start of ozone supply and, after ozone stop, the ozone water concentration exponentially decreases. The reason for this decrease is thought to be autolysis of ozone. When this decrease situation of the ozone water concentration was observed in detail, in any combination between an ozone supply time and an ozone stop time, the ozone water concentration was decreased in approximately five minutes, which is a half-life period. Also, the ozone concentration becomes 0 in approximately thirty minutes after ozone stop.

From the findings obtained from the above-described experiments, an arithmetic expression is created and stored in the storage part 16b. Thus, a rate of increase of the ozone water concentration of processed water is found from the ozone supply amount, and the ozone water concentration of processed water can be found from that rate of increase of the ozone water concentration and the ozone supply time. Also, a situation of decrease of the ozone water concentration after ozone supply stops can be found. Furthermore, from the found ozone water concentration of processed water, a TOC concentration of processed water can be found.

In FIG. 1, the TOC concentration measurement means 21 measures a TOC concentration of processed water flowing inside the circulation flow path 20. A processing purpose of the wash water processing apparatus 12 is to reduce the TOC concentration of cleaning-subject water to be a concentration equal to or smaller than a predetermined concentration. In particular, for pure water, the TOC concentration is required to be managed to be equal to or smaller than 1.0 mg/L (equal to or smaller than a predetermined value). Thus, the control apparatus 16 monitors a treatment situation, and the TOC concentration measurement means 21 is provided to determine whether the situation is favorable.

The TOC concentration adjustment means 22 includes an electric valve, an electric pump, and a flowmeter, which are not depicted. The electric valve is controlled by the control part 16a to discharge a predetermined amount of processed water. Also, the electric pump is controlled by the control part 16a to supply a predetermined amount of pure water from a pure-water manufacturing apparatus not depicted to the circulation flow path 20.

The reason for performing discharge of processed water and supply of pure water by the TOC concentration adjustment means 22 is as follows. Since it is difficult to remove TOC once eluted in processed water, processed water containing TOC is discharged to discharge TOC eluted in processed water to decrease the amount of TOC present in the washing processing part 11 and the washing processing apparatus 12. Furthermore, pure water of the same amount as that of discharged processed water is supplied to decrease the TOC concentration of wash water present in the washing processing part 11 and the washing processing apparatus 12 for reduction to a value equal to or smaller than a predetermined value.

Other than the above, to reliably clean a process-subject member in the washing processing part 11, it is required that a predetermined amount of wash water be present inside the washing processing part 11 and the cleaning apparatus 12. This is because wash water naturally decreases, so to speak, due to evaporation of wash water from a cleaning tank and with cleaning such as taking out wash water attached to the process-subject member from the cleaning tank when the process-subject member is cleaned and it is thus required to make up this naturally decreased amount of pure water. This supply also contributes to decrease in TOC concentration.

Next, the operation of the wash water processing apparatus in the present invention is described. As depicted in FIG. 1, pure water used in cleaning the process-subject member by the washing processing part 11 is flows into the wash water processing apparatus 12 via a supply flow path 23 as processed water and is stored in the wash water accommodation part 13 (capacity: 200 L to 300 L). Processed water stored in the wash water accommodation part 13 is delivered by a pump not depicted via the flow-in flow path 17 to the sterilization and purification unit 14.

Processed water delivered to the sterilization and purification unit 14 is mixed with a predetermined amount of ozone (and dissolved oxygen) from the ejector provided in the ozone supply part to generate an aqueous mixture (ozone water) with microbubble ozone dissolved in processed water. Note that, as for the supply amount of ozone here, if the ozone water concentration of processed water is high, the lives of the filter of the filtration device 26 and the ion exchange resin 27 in the filtration mechanism part 15 in the subsequent stage may be shortened and the amount of TOC eluted from the resin-made filter housing for storing the hollow fiber membrane filter and the resin-made cylinder storing the ion exchange resin thereby increase, and it is thus required to decide the supply amount of ozone by comprehensively determining the capacity of the wash water accommodation part 13, the delivery amount of processed water, a lower-limit value and an upper-limit value of the ozone water concentration for effectively performing sterilization and cleaning.

With the disinfection effect of supplied ozone, most of bacteria in processed water are killed, and most of organic matters including killed dead bacteria are decomposed.

When flowing into the ultraviolet-ray and photocatalysis unit positioned in the subsequent stage of the ozone supply part, processed water containing ozone passes through the ultraviolet light source and the photocatalyst. With processed water having ozone eluted therein applied with ultraviolet rays, a radical (which is a chemical species having an unpaired electron and is a highly-active substance) called ·OH (hydroxy radical or OH radical) is generated.

Since this ·OH is highly active, bacteria not killed in ozonizing by the ozone supply part and residing in processed water can be roughly killed, and organic matters not decomposed and residing in processed water can be roughly decomposed. Also, since the OH radical disappears for an extremely short period of time, this does not damage the filtration device 26 and the ion exchange resin 27. With the action of ozone and ultraviolet irradiation, the OH radical is generated to reliably kill bacteria and organic matters residing the wash water accommodation part 13 for sterilization and purification and also allow the lives of the filtration device 26 and the ion exchange resin 27 to be prolonged without causing damage on them.

Furthermore, with the OH radical more effectively generated by ultraviolet-ray irradiation and the action of the photocatalysis and with the combination with low-concentration ozone, that is, organic coupling, bacteria and organic matters residing in the wash water accommodation part 13 are reliably sterilized and purified, and the lives of the filtration device 26 and the ion exchange resin 27 can be prolonged without being damaged.

Processed water subject to sterilization and purification by the ultraviolet-ray and photocatalysis unit is returned via the flow-out flow path 18 to the wash water accommodation part 13.

In this manner, cleaning-subject water stored in the wash water accommodation part 13 is subject to sterilization and purification as circulating between the wash water accommodation part 13 and the sterilization and purification unit 14. Thus, the disinfection effect is exerted also in the wash water accommodation part 13 by ozone residing processed water returned to the wash water accommodation part 13, the growth of bacteria is reduced, and the occurrence of a biofilm on a wall surface of the wash water accommodation part 13 or the like is reduced.

Also, after sterilization and purification by the sterilization and purification unit 14, processed water is not immediately sent to the filtration mechanism part 15 but is mixed, after returned to the wash water accommodation part 13, with processed water stored in the wash water accommodation part 13. Thus, the ozone water concentration of processed water stored in the wash water accommodation part 13 as a whole is diluted, and ozone is dissolved while processed water is stored in the wash water accommodation part 13. Thus, the ozone water concentration of processed water to be sent to the filtration mechanism part 15 decreases.

On the other hand, to prevent the growth of bacteria in the washing processing part 11, it is noted that ozone is contained in wash water returned from the wash water processing apparatus 12 to the washing processing part 11 and it is required to maintain the ozone water concentration to some extent even though the wash water is returned to the washing processing part 11 and mixed with wash water stored in the washing processing part 11. According to the experiment results by the inventors, disinfection power of ozone is extremely strong, and substantially all bacteria can be killed within several minutes if the ozone water concentration is on the order of 0.05 (mg/L). Thus, if the treatment water amount is on the order of 40 (L), a supply amount of ozone from the ozone supply part of the sterilization and purification unit 14 on the order of 0.05 (mg/L) is sufficient, even in consideration of dilution and decomposition in the wash water accommodation part 13.

In this manner, processed water with the ozone water concentration decreased to some extent in the wash water accommodation part 13 is sent via the filtration flow path 19 to the filtration mechanism part 15. However, as described above, the amount of ozone supply from the ozone supply part of the sterilization and purification unit 14 to processed water is small, and also with autolysis of ozone, the ozone water concentration of processed water decreases, and therefore there is no possibility that residual ozone in processed water can damage the filter of the filtration device 26 and the ion exchange resin 27 in the filtration mechanism part 15 and shorten their lives. Furthermore, by low-concentration ozone, in the present embodiment, while the inside of the filtration mechanism part 15 is sterilized, TOC elution is reduced to minimum, and processed water is managed so as to have an ozone concentration sufficient for sterilization.

Also, bacteria residing in processed water are roughly killed by the sterilization and purification unit 14, and also processed water with organic matters residing in processed water roughly decomposed is sent via the filtration flow path 19 to the filtration mechanism part 15. Thus, clogging of the filter of the filtration mechanism part with bacteria and organic matters and reduction in function of the ion exchange resin less tend to occur, and the lives of these can be extended.

Processed water sent from the wash water accommodation part 13 to the filtration mechanism part 15 is, after filtration is performed in which bacteria and organic matters residing in processed water are removed by the filtration device 26 and after saline components in processed water that cannot be removed by ozonizing or filtration are removed by the ion exchange resin 27, returned via the circulation flow path 20 to the washing processing part 11.

Meanwhile, in the wash water processing apparatus 12 of the present invention, by making low-concentration ozone contained in processed water to be returned to the washing processing part 11 after sterilization and purification, an increase of bacteria in the washing processing part 11 is tried to be prevented. Thus, to processed water containing ozone, although at low concentration, TOC is eluded from the resin-made impeller in the sterilization and purification unit 14, the resin-made filter housing of the filtration device 26, and the resin-made cylinder of the ion exchange resin 27.

Thus, if processed water after sterilization and purification is returned as it is to the washing processing part 11, the TOC concentration in wash water inside the washing processing part 11 sequentially increases and, eventually, water quality requirements as pure water become unsatisfied. To reduce an increase in TOC concentration of this wash water in the washing processing part 11, in the wash water processing apparatus of the present invention, the TOC concentration adjustment means 22 is provided to the circulation flow path 20 of processed water and, before processed water is returned to the washing processing part 11, processed water is discharged in accordance with the ozone water concentration and the TOC concentration of processed water and pure water is supplied, thereby allowing the TOC concentration of wash water for use in the washing processing part 11 to be reduced to a value equal to or smaller than a predetermined value. In the present embodiment, since the TOC concentration adjustment means 22 is provided to the circulation flow path 20 immediately before the washing processing part 11, this is suitable for accurately adjusting the TOC concentration.

As has been described above, in the wash water processing apparatus 12, pure water used in cleaning the process-subject member by the washing processing part 11 is stored in the wash water accommodation part 13 as processed water. While processed water is circulated between the wash water accommodation part 13 and the sterilization and purification unit 14, sterilization and purification are continuously performed. At the same time, after stored processed water is sent to the filtration mechanism part 15 for filtration, the TOC concentration adjustment means 22 performs supply of pure water to processed water, or discharge of processed water and supply of pure water in accordance with the ozone water concentration and the TOC concentration of processed water, and then the resultant water is returned to the washing processing part 11. Thus, the TOC concentration of wash water for use in the washing processing part 11 is reduced to a value equal to or smaller than a predetermined value.

While processed water is circulated between the wash water accommodation part 13 and the sterilization and purification unit 14, sterilization and purification are performed. Thus, sterilized and purified treatment water with dissolved ozone is returned to the wash water accommodation part 13, and organic matters and bacteria contained in processed water in the wash water accommodation part 13 are gradually reduced, and the growth of bacteria in the wash water accommodation part 13 can be reduced.

As a result, bacteria and organic matters contained in processed water to send from the wash water accommodation part 13 to the filtration mechanism part 15 are significantly decreased, compared with a case of no circulation in the sterilization and purification unit 14. Thus, the occurrence of clogging of the filter of the filtration device 26 because of filtration of bacteria and organic matters and reduction in function of the ion exchange resin 27 can be reduced.

Also, while processed water to be sent from the wash water accommodation part 13 to the filtration mechanism part 15 may contain low-concentration ozone, this ozone has a low concentration to the extent of not influencing the function of the filter and so forth, and does not damage the filter of the filtration device 26 and the ion exchange resin 27 in the filtration mechanism part 15, and the growth of bacteria can be reduced in the filtration mechanism part 15, the circulation flow path 20, and the washing processing part 11.

In the filtration mechanism part 15, a filter (preferably, a hollow fiber membrane that is of a UF film) in the filtration device 26 removes fine particles, bacteria, and high-polymer organic matters, and also can remove saline components such as calcium, sodium, chloride, and sulfuric acid in processed water that cannot be removed by ozonizing or filtration by the ion exchange resin 27.

Also, since processed water contains ozone, although at low concentration, an increase in TOC concentration due to TOC eluded from the resin-made impeller, filter housing, cylinder, and so forth is addressed by the TOC concentration adjustment means 22 performing supply of pure water to processed water, or discharge of processed water and supply of pure water in accordance with the ozone water concentration and the TOC concentration of processed water to reduce the TOC concentration of wash water to a value equal to or smaller than a predetermined value and, eventually, processed water is made reusable as pure water satisfying water quality requirements.

In the wash water processing apparatus of the present invention, sterilization and purification and filtration are performed on processed water in a manner as described above, and the TOC concentration is reduced to a concentration equal to or smaller than a predetermined concentration. Thus, even if processed water is reused as wash water (pure water) in the washing processing part, there is no adverse effect on product quality, and pure water to be used by the washing processing part over a long period of time is saved to allow stable cleaning, thereby allowing reduction in cleaning cost.

Next, a wash water processing method using the wash water processing apparatus of the present invention is described. First, a case is described in which a predetermined amount of ozone is continuously supplied from the ozone supply part in the sterilization and purification unit. In this wash water processing method of continuously supplying ozone, with the predetermined amount of ozone continuously supplied, a total supply amount of ozone increases. Thus, this method can be applied to a case of, for example, effectively disinfecting and purifying processed water which cleans a large-sized process-subject member and contains a large amount of mixture of bacteria and organic matters.

To perform this wash water processing method, a total wash water amount (L) (for example, the capacity of a cleaning watertank provided in the washing processing part), an ozone supply amount (g/h), and a ratio of processed water to be supplied with respect to the total wash water amount are inputted as process targets. Based on an TOC increase rate per unit time, arithmetic equations for sequentially calculating a TOC amount (mg) contained in the total wash water, a discharge amount (L) of wash water (pure water amount to be supplied (L)), a TOC amount (mg) contained in total wash water after supply of pure water, and a TOC concentration (mg/L) of total wash water after supply of pure water are called from the storage part 16b to find a transition of the TOC concentration (mg/L) of total wash water after supply of pure water.

Here, while the total wash water amount (L) and the ozone supply amount (g/h) as process targets have fixed values, the ratio of processed water to be discharged with respect to the total wash water amount can be freely changed. Thus, when this value is changed to find a transition of the TOC concentration (mg/L) of total wash water after supply of pure water, it is possible to find a ratio of processed water to be discharged with respect to the total wash water amount in which the TOC concentration (mg/L) of total wash water after supply of pure water does not exceed 1.0 (mg/L), which is a reference for pure water.

Figure 14:
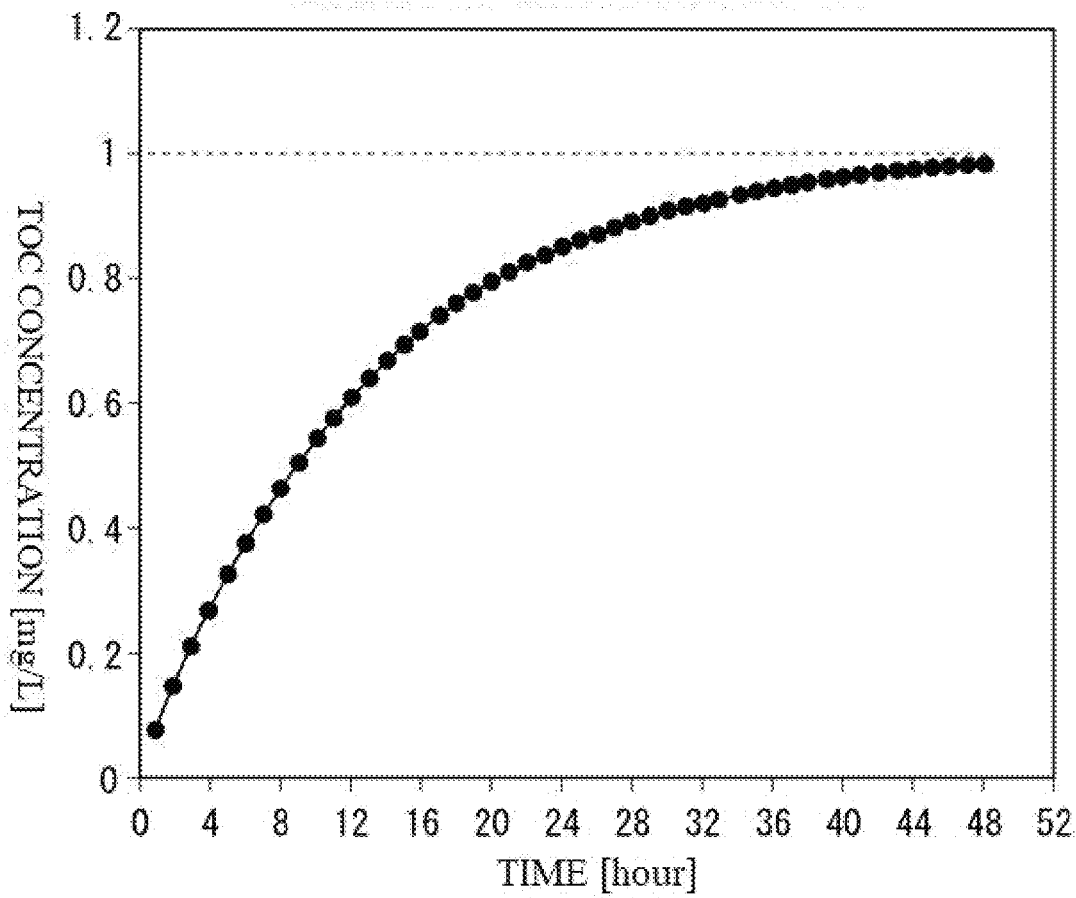
FIG. 14 is a graph indicating TOC concentration simulation results of processed water with ozone supply time changed, and when a constant amount of processed water is continuously drained and a constant amount of pure water is continuously supplied.

FIG. 14 depicts simulation results in which a transition of the TOC concentration (mg/L) of total wash water is found when the total wash water amount is set to be 40 (L), the ozone supply amount is set to be 0.5 (g/h), and the amount of discharge of processed water and the amount of supply of pure water are set to be 3 (L/h). As depicted in the drawing, the TOC concentration of total wash water does not exceed the TOC concentration of 1.0 (mg/L), which is a water quality requirement for pure water even after treatment time elapses.

Note that as for a relation between the ozone supply amount and the ozone-water concentration of processed water, as depicted in FIG. 12, since the concentration of ozone water after ozone supply does not increase more than a predetermined concentration, from the drawing, 0.32 (mg/L) where the ozone-water concentration becomes stable when ozone of 0.5 (g/h) is supplied is set as an ozone water concentration and a rate of increase of ozone with respect to this ozone water concentration is found from (Equation 1) described above for use in simulation.

Therefore, when this wash water processing method of continuously supplying a predetermined amount of ozone is performed by the wash water processing apparatus of the present invention, while ozone of 0.5 (g/h) is continuously supplied from the ozone supply part in the sterilization and purification unit 14, the TOC concentration adjustment means 22 discharges processed water of 3 (L/h) and pure water is supplied at a ratio of 3 (L/h). Thus, the TOC concentration of wash water for use in the washing processing part 11 can be reduced to be equal to or smaller than 1.0 (mg/L).

Next, a case is described in which pure water equivalent to an amount of wash water naturally decreasing when a cleaning-subject member is cleaned by the washing processing part is supplied by the TOC concentration adjustment means and a predetermined amount of ozone is intermittently supplied from the ozone supply part. In this wash water processing method, since the amount of supply of pure water is equivalent to an amount naturally decreasing at the time of cleaning the process-subject member, the use amount of expensive pure water is minimized to allow reduction in cleaning cost. Also, since a predetermined amount of ozone is supplied by intermittent supply of repeating supply for a predetermined time and stop for a predetermined time, the total supply amount of ozone is not large. Thus, this method can be applied to a case of, for example, disinfecting and purifying, at low cost, processed water which cleans a small-sized processed member and contains not much mixture of bacteria and organic matters. Note that wash water naturally decreasing at the time of cleaning include wash water evaporating from the cleaning tank and wash water attached to the process-subject member or the like at the time of cleaning of the processed member and taken out.

To perform this wash water processing method, a total wash water amount (L) (for example, the capacity of a cleaning watertank provided in the washing processing part), an ozone supply amount (g/h), a ratio of pure water to be supplied with respect to the total wash water amount, and an ON time (min) in which ozone is supplied and an OFF time (min) in which supply stops are inputted as process targets. Based on a coefficient of increase in ozone water concentration in accordance with the ozone supply amount and a tendency in which the ozone water concentration decreases in a half-life period of five minutes when ozone supply stops, the arithmetic expression capable of finding changes in concentration of ozone water with respect to the process time and an ozone water concentration of processed water from these changes in concentration of ozone water with respect to the process time is called from the storage part 16b, and a transition of the TOC concentration (mg/L) of total wash water can be found.

Here, while the total wash water amount (L), the ozone supply amount (g/h), and the amount of pure water (L/min) to be supplied to make up the naturally decreased amount of wash water as process targets have fixed values, a combination of an ON time (min) in which ozone is supplied and an OFF time (min) in which ozone is not supplied can be freely changed. Thus, when these ON time and OFF time are changed to find a transition of the TOC concentration (mg/L) of total wash water, it is possible to find a combination between the ON time in which ozone is supplied and the OFF time in which supply stops in which the TOC concentration (mg/L) of total wash water after supply of pure water does not exceed 1.0 (mg/L), which is a reference for pure water.

Figure 15:
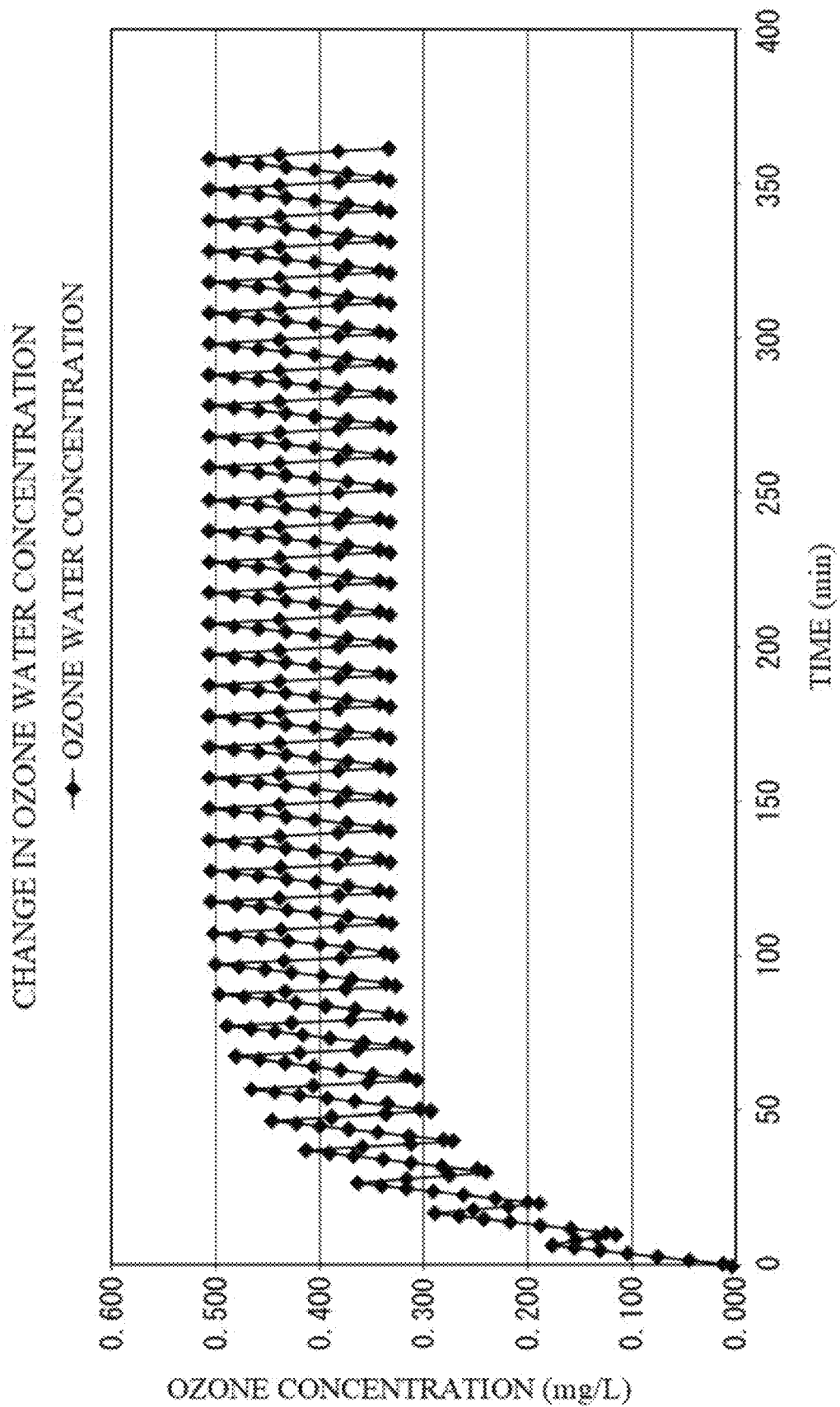
FIG. 15 is a graph indicating ozone-water concentration simulation results of processed water when a constant amount of ozone is intermittently supplied.
Figure 16:
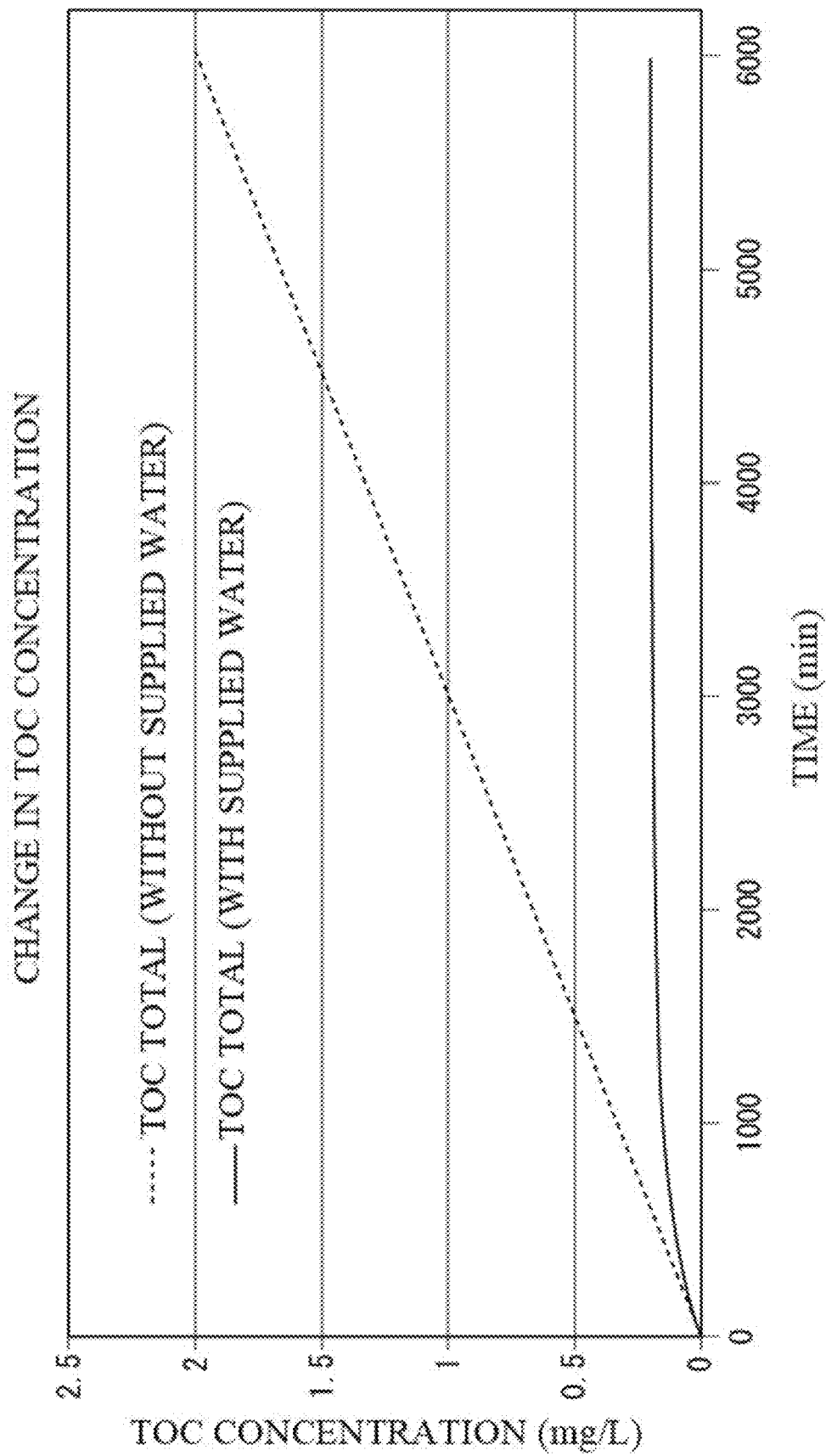
FIG. 16 is graph indicating TOC concentration simulation results of processed water with a constant amount of ozone being intermittently supplied, and when pure water is supplied and when not supplied.

FIG. 15 depicts results of simulating changes in ozone water concentration when the total wash water amount is set to be 40 (L), the ozone supply amount is set to be 0.5 (g/h), and the amount of supply of pure water is set to be 2.7 (L/min) and when the ON time in which ozone is supplied is set to be 7 (min) and the OFF time in which ozone supply stops is set to be 3 (min). FIG. 16 depicts results of simulating changes in TOC concentration of total wash water here when pure water is supplied and when not supplied. As depicted in FIG. 16, the TOC concentration of total wash water when pure water equivalent to the naturally decreased amount of wash water is supplied is well below the TOC concentration of 1.0 (mg/L), which is a water quality requirement for pure water even after treatment time elapses.

Therefore, when the wash water processing method of intermittently supplying a predetermined amount of ozone is performed by the wash water processing apparatus of the present invention, while ozone of 0.5 (g/h) is continuously supplied from the ozone supply part of the sterilization and purification unit 14, the ON time in which ozone is supplied and the OFF time in which supply stops are set as appropriate. Also, if pure water equivalent to the naturally decreased amount of wash water is supplied, the TOC concentration of wash water for use in the washing processing part 11 can be reduced to a value equal to or smaller than 1.0 (mg/L).

Figure 17:
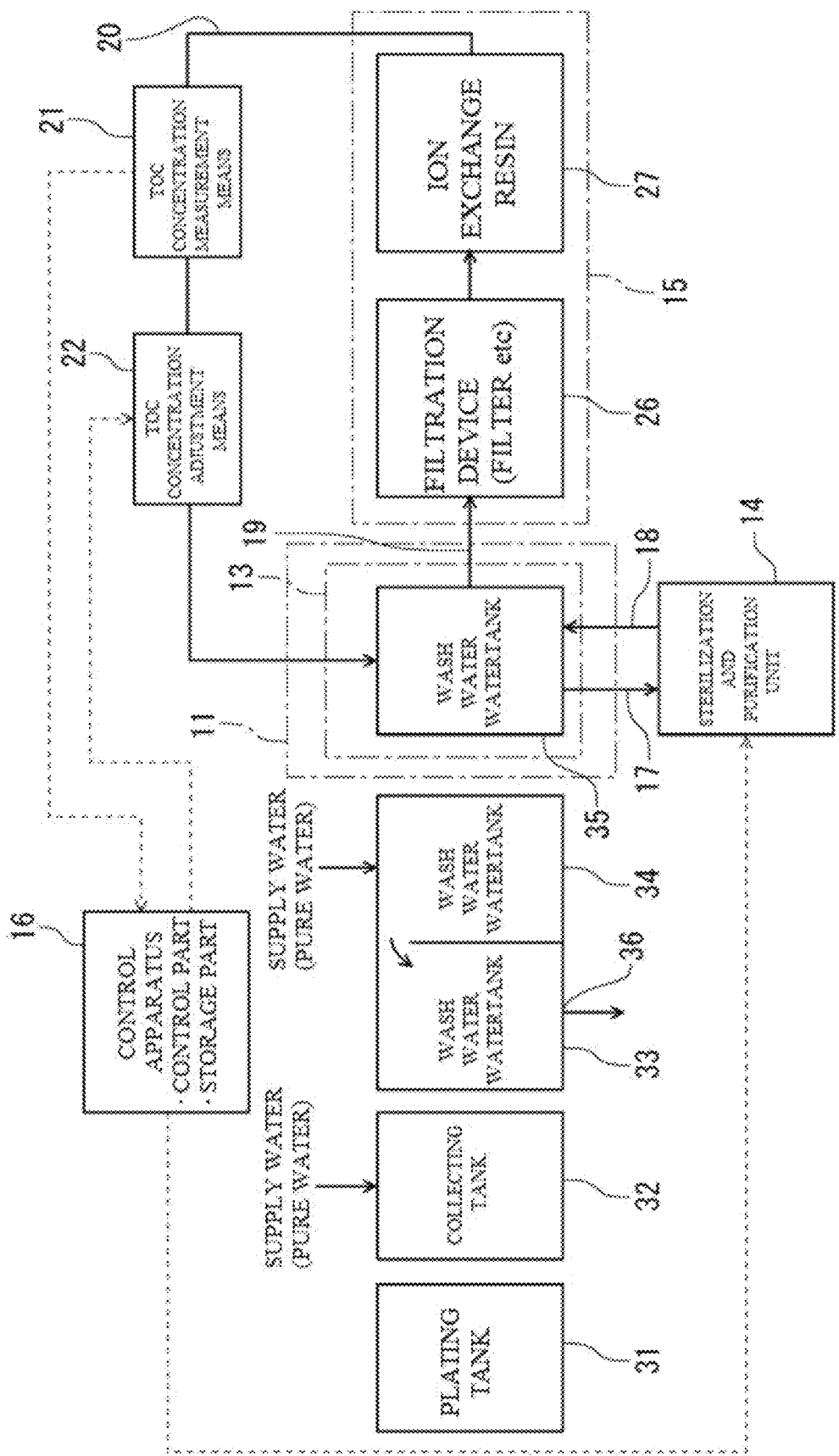
FIG. 17 is a schematic diagram depicting a case when the wash water processing apparatus of the present invention is applied to a final wash water watertank of a plurality of wash water watertanks in a plating process.

Next, a case is described in which the wash water processing apparatus of the present invention is applied to a plating process. Note that the same reference numerals are used for portions having the same function as that described so far and description of these portions is omitted. As depicted in FIG. 17, in this plating process, the sterilization and purification unit 14 is connected to a last wash water watertank 35 among three wash water watertanks other than a plating tank 31.

In this plating process, a collecting tank 32 is provided to collect plating solution, and wash water watertanks 33, 34, and 35 are provided to clean the process-subject body after plating process.

The wash water watertank 33 and the wash water watertank 34 are provided as being connected together, are configured so that pure water supplied to the wash water watertank 34 overflows over a partition between the wash water watertank 33 and the wash water watertank 34 to flow into the inside of the wash water watertank 33 and is discharged from a drain port 36 provided to the wash water watertank 33.

In the wash water watertank 35, pure water for cleaning is retained. The wash water watertank 35 and the sterilization and purification unit 14 are connected by the flow-in flow path 17 and the flow-out flow path 18 so as to allow circulation. Also, the wash water watertank 35 and the filtration mechanism part 15 are connected together by the filtration flow path 19. Furthermore, the filtration mechanism part 15 and the wash water watertank 35 are connected by the circulation flow path 20, and the TOC concentration measurement means 21 and the TOC concentration adjustment means 22 are provided to the circulation flow path 20.

Note that the TOC concentration measurement means 21 may measure a TOC concentration at all times by using an online TOC meter and may measure a TOC concentration by sampling wash water from the circulation flow path.

That is, in the plating process depicted in FIG. 17, the wash water watertank 35 serves as the washing processing part 11 and also as the wash water accommodation part 13. Therefore, pure water used in cleaning the process-subject body in the wash water watertank 35, which is the washing processing part 11, is subjected to sterilization and purification as being circulated between the wash water watertank 35 and the sterilization and purification unit 14, is also sent from the wash water watertank 35 to the filtration mechanism part 15 to be subjected to filtration, and is then returned to the wash water watertank 35, which is the washing processing part.

In this manner, wash water stored in the wash water watertank 35 serving as the wash water accommodation part 13 is subjected to sterilization and purification as being circulated between the wash water watertank 35 and the sterilization and purification unit 14, and is also subjected to filtration as being circulated between the wash water watertank 35 and the filtration mechanism part 15. Furthermore, the TOC concentration adjustment means 22 performs supply of pure water to processed water, or discharge of processed water and supply of pure water in accordance with the ozone water concentration and the TOC concentration of processed water to reduce the TOC concentration. Thus, wash water in the wash water watertank 35 is maintained as being reusable as pure water satisfying water quality requirements.

Figure 18:
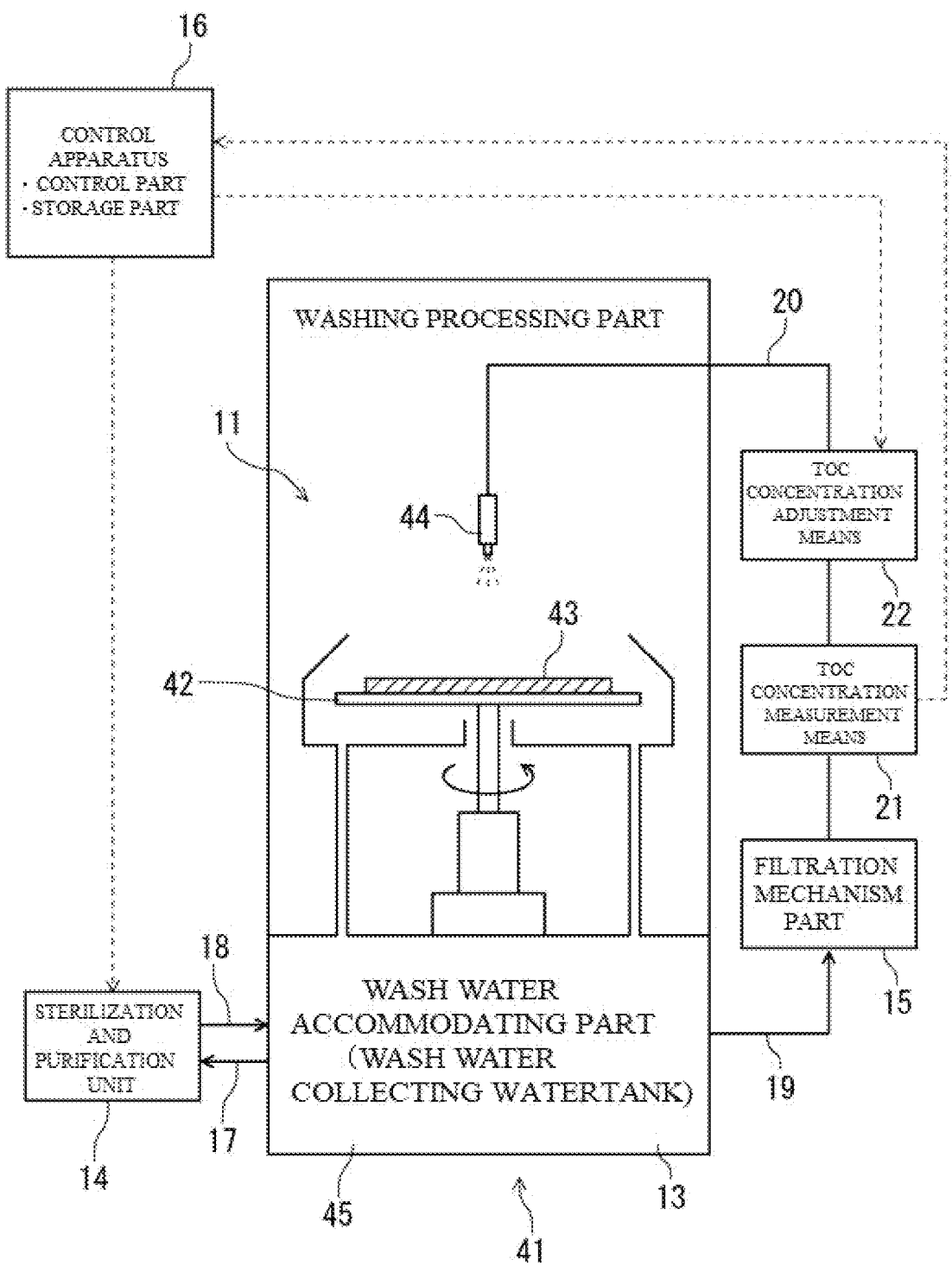
FIG. 18 is a schematic diagram depicting a case when the wash water processing apparatus of the present invention is applied to a semiconductor process state.

Next, a case is described in which the wash water processing apparatus of the present invention is applied to a semiconductor manufacturing apparatus. The same reference numerals are used for portions having the same function as that described so far and description of these portions is omitted. FIG. 18 schematically depicts a depicts a situation in which a single-wafer cleaning apparatus 41, depicting a situation in which pure water is sprayed from a nozzle 44 onto a rotating wafer 43 placed on a turntable 42 to clean the surface of the wafer 43. Pure water used in cleaning is stored as processed water in a wash water collecting watertank 45 provided to a lower part of the single-wafer cleaning apparatus 41.

Therefore, in the single-wafer cleaning apparatus 41 of FIG. 18, the nozzle 44 and the turntable 42 serve as the washing processing part 11, and the wash water collecting watertank 45 provided to the lower part of the single-wafer cleaning apparatus 41 serves as the wash water accommodation part 13.

In the single-wafer cleaning apparatus 41, as with the plating process of FIG. 17, wash water stored in the wash water collecting watertank 45 serving as the wash water accommodation part 13 is subjected to sterilization and purification as being circulated between the wash water collecting watertank 45 and the sterilization and purification unit 14, and is also subjected to filtration as being circulated between the wash water collecting watertank 45 and the filtration mechanism part 15. Furthermore, the TOC concentration adjustment means 22 performs supply of pure water to processed water, or discharge of processed water and supply of pure water in accordance with the ozone water concentration and the TOC concentration of processed water to reduce the TOC concentration. Thus, wash water in the wash water collecting watertank 45 is maintained as being reusable as pure water satisfying water quality requirements.

In the single-wafer cleaning apparatus 41 of FIG. 18, pure water is taken as processed water, and processed water collected in the wash water collecting watertank 45 is treated so as to be reusable. However, if wash water discharged from the nozzle 44 is treated so as to be reusable, the wash water collecting watertank 45 is not necessarily required to be independently provided in the single-wafer cleaning apparatus 41. From this, the single-wafer cleaning apparatus may be configured so that the sterilization and purification unit 14, the filtration mechanism part 15, the TOC measurement means 21, and the TOC concentration adjustment means 22 are provided to any location in a long flow path until processed water reaches the nozzle 44 and processed water is treated in this flow path so as to be reusable. With this, the apparatus is suitable when, for example, ultrapure water is taken as processed water and the highly-integrated wafer 43 is cleaned by using this ultrapure water.

In this case, when the single-wafer cleaning apparatus is being operated (at the time of the cleaning process), ultrapure water for cleaning intermittently flows into the single-wafer cleaning apparatus at timing of cleaning of the wafer 43 and flows through the long flow path to the nozzle 44 in a state in which this ultrapure water contains organic matters. This is substantially equivalent to a case in which when the long flow path to the nozzle 44 is taken as a wash water collecting watertank, wash water containing organic matters is stored in the above-described wash water collecting watertank 45.

In addition to this, ultrapure water to be taken in from the outside of the single-wafer cleaning apparatus to treat processed water in the flow path so that it is reusable may also contain a very small amount of organic matters.

These organic matters can be attached to the inside of a pipe such as a PFA-made tube forming a flow path and can be contained in ultrapure water for use as wash water sometime or other.

From this, in this single-wafer cleaning apparatus, it is required to clean not only wash water after cleaning of the wafer 43 but also the flow path such as the inside of the pipe to the nozzle 44 to remove organic matters attached to the inside. Here, if the pipe is made of resin such as PFA, it is resistant to ozone, but there is a possibility that a trace amount of TOC is generated and, as a problem unique to ultrapure water, there is also a possibility that TOC components on the pipe surface tend to be eluted. Thus, as with the above-described case, at the time of disinfection by ozone, it is required to also consider reduction in TOC concentration.

Thus, processed water (ultrapure water) retained in the flow path is cleaned by the sterilization and purification unit 14 provided to the above-described flow path, and processed water in the single-wafer cleaning apparatus is let flow through the filtration mechanism part 15, the TOC concentration measurement means 21, and the TOC concentration adjustment means 22 to perform sterilization and purification. With this, in either of a case in which a single-wafer cleaning apparatus of this type is newly introduced into the cleaning process and a case in which it is operated for a long period of time, it is possible to supply, from the nozzle 44, processed water with organic matters removed, while reducing the TOC concentration.

Here, supplied processed water (ultrapure water) is added with ozone by the sterilization and purification unit 14 and then flows through the above-described long flow path. In this course of adding ozone, autolysis of ozone proceeds, part of which generates an ·OH radical, promoting decomposition of eluted TOC components and organic matters attached to the inside of piping. From this, by adjusting the ozone generation amount from the sterilization and purification unit 14 in accordance with the flow velocity and flow rate of processed water, it is possible to cause ozone, the content of which tends to decrease more near a secondary side of the long flow path due to autolysis, to sufficiently remain. This allows ozone water with the residual ozone concentration kept to flow over the entire long flow path to decompose organic matters in the entire piping.

In the case of the single-wafer cleaning apparatus in which the entire flow path is taken as a wash water collecting watertank as described above, at the time of non-maintenance for cleaning the wafer 43 (non-operation) and at the time of newly installing this single-wafer cleaning apparatus, the degree of contamination of the flow path by processed water is approximately constant. Thus, in a state in which the filtration mechanism part 15 and the TOC concentration measurement means 21 are removed, ultrapure water is supplied by the TOC concentration adjustment means 22, and ultrapure water residing in the long flow path is mixed, the ozone water concentration is adjusted by the sterilization and purification unit 14 to allow the inside of the flow path to be cleaned. According to this, it is possible to decompose organic matters in the flow path even at a time other than the time of cleaning the wafer 43, such as the time of maintenance or new installation of the single-wafer cleaning apparatus.

In other words, the present invention can be said as a cleaning method in which, in a method of cleaning a semiconductor wafer cleaning apparatus using ultrapure water, ultrapure water is supplied by the TOC concentration adjustment means, the sterilization and purification unit sterilizes and purifies this ultrapure water and adjusts the ozone generation amount in accordance with the flow velocity and flow rate of processed water supplied in advance to the inside of the apparatus so that ozone resides in flow path piping to a tip nozzle and, by supply of ultrapure water and adjustment of the ozone water concentration, organic matters in the flow path piping are decomposed and a trace amount of TOC generated from the flow path piping is reduced.

In particular, at the time of non-operation of the apparatus, sterilization and purification can be performed in a state in which ultrapure water residing in the piping and supplied ultrapure water are mixed.

In this case, when ultrapure water is supplied from outside by the TOC concentration adjustment means and processed water is let flow inside the flow path to dilute the TOC concentration, a structure may be such that, for example, a drain not depicted is provided at an appropriate position in the flow path and drainage is performed to the outside of the single-wafer cleaning apparatus through this drain. Here, the process is of a non-circular type in which processed water is not circulated. Thus, when the TOC concentration is adjusted, its concentration can be efficiently reduced to a value equal to or smaller than 0.01 mg/L, which is an index as ultrapure water.

The sterilization and purification unit 14 may be provided inside the single-wafer cleaning apparatus. In this case, it is provided to the nearest location of the flow path. Thus, an ·OH radical generated from ozone that is easy to autolyze can be effectively introduced to the flow path and ozone water with the maintained disinfecting power can be let flow through the entire flow path.

Note that while it has been known that functional water for cleaning added with a very small amount of ozone (Introduction to Analytical Chemistry Vol. 59, No. 5, pp. 349-356 (2010)) is used for this cleaning, the present invention is different from the case of using simply functional water for cleaning in controlling the ozone water concentration in accordance with the flow velocity and flow rate of processed water flowing inside piping and controlling to reduce a trace amount of TOC due to addition of ozone and TOC components eluted to ultrapure water.

Figure 19:
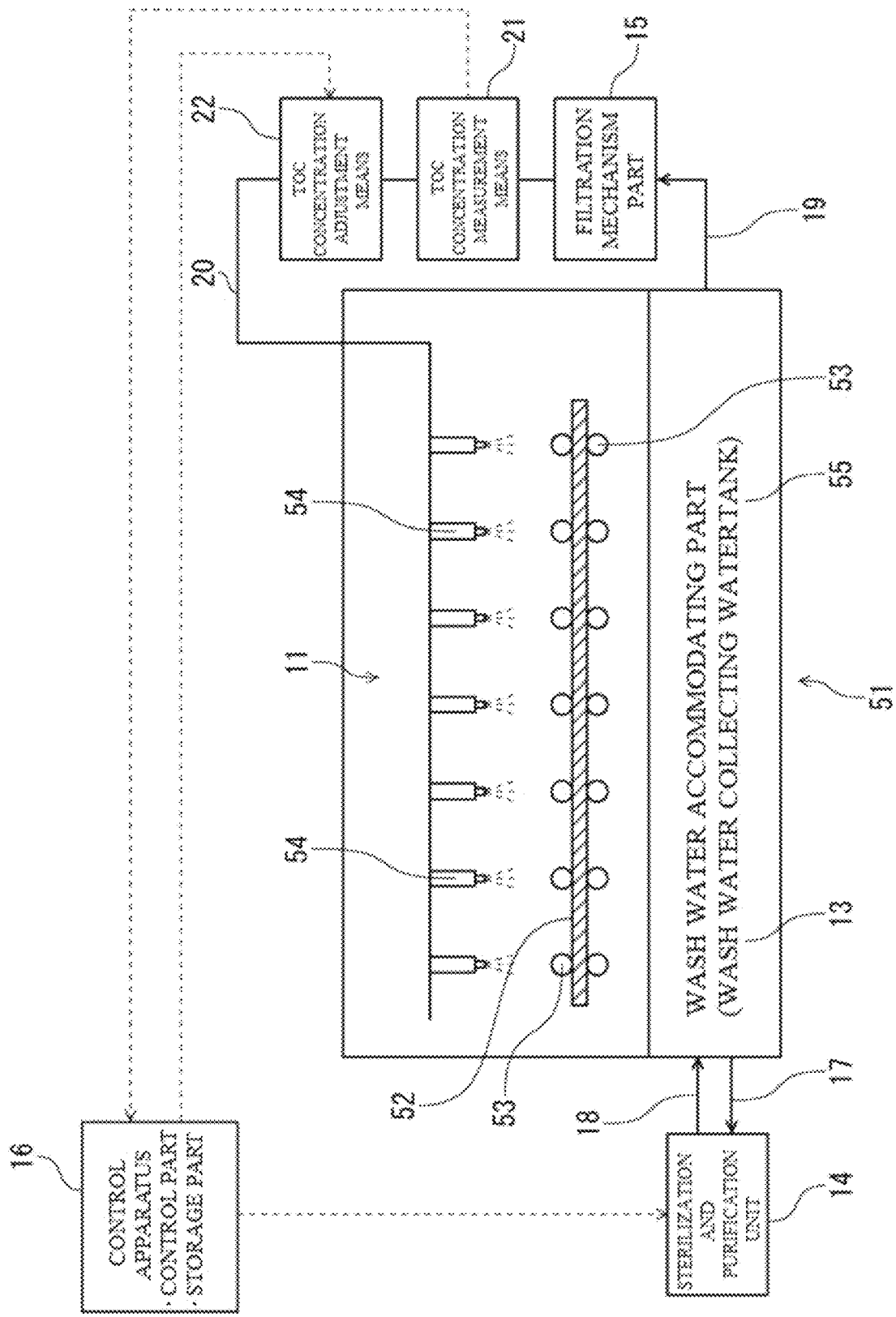
FIG. 19 is a schematic diagram depicting a case in which the wash water processing apparatus of the present invention is applied to a glass substrate manufacturing apparatus.

Furthermore, a case is described in which the wash water processing apparatus of the present invention is applied to a glass substrate manufacturing apparatus. FIG. 19 schematically depicts a glass-substrate cleaning apparatus 51 of a horizontal transportation type. As being conveyed by conveyance rollers 53, a glass substrate 52 is sprayed with pure water from a cleaning nozzle 54 for cleaning. Pure water used in cleaning is stored as processed water in a wash water collecting watertank 55 provided to a lower part of the glass-substrate cleaning apparatus 51.

Therefore, in the glass-substrate cleaning apparatus 51 in the drawing, the cleaning nozzle 54 and the conveyance rollers 53 serve as the washing processing part 11, and the wash water collecting watertank 55 provided to the lower part of the glass-substrate cleaning apparatus 51 serves as the wash water accommodation part 13.

In this glass-substrate cleaning apparatus 51, as with the plating process of FIG. 17 and the single-wafer cleaning apparatus 41 of FIG. 18, wash water stored in the wash water collecting watertank 55 serving as the wash water accommodation part 13 is subjected to sterilization and purification as being circulated to and from the sterilization and purification unit 14, and is also subjected to filtration as being circulated between the wash water collecting watertank 55 and the filtration mechanism part 15. Furthermore, the TOC concentration adjustment means 22 performs supply of pure water to processed water, or discharge of processed water and supply of pure water in accordance with the ozone water concentration and the TOC concentration of processed water to reduce the TOC concentration. Thus, wash water in the wash water collecting watertank 55 is maintained as being reusable as pure water satisfying water quality requirements.

As has been described in the foregoing, according to the wash water processing apparatus and wash water processing method of the present invention, pure water used in cleaning the cleaning-subject member by the washing processing part is subjected to sterilization and purification and filtration to keep bacteria and organic matters at a lower level, and the TOC concentration is reduced to a value equal to or smaller than a predetermined concentration. Thus, sterilization and filtration of wash water for reuse and TOC elution from the filter housing or the like, which are so-called contradictory functions, are both achieved, and the resultant water can be reused as wash water satisfying water quality requirements as pure water.

Also, processed water returned to the washing processing part contains ozone at a low concentration. Thus, the growth of bacteria in the washing processing part and the wash water processing apparatus is prevented, and intervals of cleaning to the washing processing part and replacement of pure water can be prolonged. Also, the lives of the filtration filter and the ion exchange resin in the wash water processing apparatus can be extended. With this, it is possible to improve the rate of operation of a manufacturing apparatus using the wash water processing apparatus and wash water processing method of the present invention to reduce manufacturing cost.

Also, in the present embodiment, as for the arithmetic expression in which the findings obtained from the above-described experiments are converted to digital form and a data table in digital form, when a resin-made filter housing and a resin-made cylinder are used, that is, they represent a condition in which TOC is assumed to be eluted most. Thus, if the filter housing is made of stainless steel or the cylinder is made of stainless steel, the TOC concentration is less than actual one. Thus, these arithmetic expression and data table can be used.

And, the relation between the ozone-water concentration and the TOC concentration for use in the arithmetic expression and the data table may be experimentally obtained (so-called on-site adjustment) by using a wash water processing apparatus for use in the actual site for cleaning a semiconductor wafer substrate, a liquid-crystal glass substrate, a glass substrate, a plated electronic component, and so forth.

Note that the TOC concentration adjustment means 22 may be provided to any location in the circulation flow path 20. However, when it is provided in the subsequent stage of the filtration mechanism part 15, the TOC concentration of wash water before cleaning is the lowest. Thus, it is preferable to provide it at this position.

Also in the present embodiment, description has been made mainly on the wash water processing apparatus and its method in which processed water is pure water. However, the embodiment can be applied also when processed water is ultrapure water. In this case, if the reference value of the TOC concentration adjustment means is defined at, for example, 0.01 (mg/L), and discharge of processed water and supply of pure water or ultrapure water are controlled so that the TOC concentration is reduced to a value equal to or smaller than the reference value in accordance with the ozone-water concentration for use in the wash water pro-

REFERENCE SIGNS LIST 11 washing processing part
12 wash water processing apparatus
13 wash water accommodation part
14 sterilization and purification unit (sterilization and water-purification apparatus)
15 filtration mechanism part
16 control apparatus
17 flow-in flow path
18 flow-out flow path
19 filtration flow path
20 circulation flow path
22 TOC concentration adjustment means
26 filtration device
27 ion exchange resin

The invention claimed is:

1. A wash water processing apparatus for semiconductor manufacture, liquid-crystal manufacture, and electronic components, the apparatus having:
a washing processing part for cleaning at semiconductor manufacture or liquid-crystal manufacture and cleaning electronic components;
a wash water storage part connected to the washing processing part via a circulation flow path in order to allow pure water after cleaning flow as processed water and store thereof;
a sterilization and purification unit which has an ozone supply part connected to the wash water storage part via a flow-in flow path and a flow-out flow path so that processed water is circulatable;
a filtration mechanism part which is configured to include a filtration device of a filter connected to a subsequent part following the wash water storage part via a filtration flow path and an ion exchange resin;
the circulation flow path connecting the subsequent part following the filtration mechanism part and the washing processing part; and
TOC concentration measurement means and TOC concentration adjustment means provided midway in the circulation flow path,
wherein: the washing processing part, the wash water storage part, and the filtration mechanism part are connected so as to configure the entire wash water processing apparatus without ends, in circulatable state;
the TOC concentration adjustment means is adjustment means for performing discharge of processed water and supply of pure water to prevent elution of TOC from each portion configuring the wash water storage part and the filtration mechanism part;
the apparatus further comprises a control apparatus having a memory part storing an arithmetic expression capable of calculating a discharge amount of processed water and a supply amount of pure water in accordance with an ozone-water concentration and a TOC concentration of processed water;
bacteria in the processed water in the wash water storage part are sterilized and decomposed by circulation between the wash water storage part and the sterilization and purification unit;
the ozone-water concentration is controlled to a low concentration by mixture of processed water flowing in from the washing processing part and stored in the wash water storage part and sterilized and dissolved processed water and by autolysis of ozone;
the control apparatus controls the ozone supply part by passing low-concentration ozone water having an ozone-water concentration equal to or less than 5.37 mg/L from the wash water storage part through both the filter and the ion exchange resin in order to suppress oxidative deterioration of the filter and the ion exchange resin to reduce a decrease in filtration performance of the filtration mechanism part;
the low-concentration ozone water reduces an occurrence of slime occurring to the filter and the ion exchange resin themselves;
and, in accordance with a TOC concentration eluted from each portion configuring the wash water storage part and the filtration mechanism part, by discharge of processed water and supply of pure water at the TOC concentration adjustment means, before the washing processing part, the TOC concentration of wash water for use is controlled at a control value equal to or less than a predetermined value in pure water to control so that the processed water is usable for cleaning at the washing processing part.

2. The wash water processing apparatus for semiconductor manufacture, liquid-crystal manufacture, and electronic components according to claim 1, wherein the control apparatus is configured to calculate the discharge amount of processed water and the supply amount of pure water in accordance with the ozone-water concentration and the TOC concentration of processed water by using the memory part storing a data table.

3. The wash water processing apparatus for semiconductor manufacture, liquid-crystal manufacture, and electronic components according to claim 1, wherein the filter is a hollow fiber membrane filter or an activated carbon filter.

4. A wash water processing method for semiconductor manufacture, liquid-crystal manufacture, and electronic components, having a washing processing part for cleaning at semiconductor manufacture or liquid-crystal manufacture and cleaning electronic components, and a wash water storage part connected to the washing processing part via a circulation flow path in order to allow pure water after cleaning to flow in as processed water for storage thereof, the method comprising:
a circulation step of a first circulation system in a sterilization and purification unit and having an ozone supply part connected to this wash water storage part via a flow-in flow path and a flow-out flow path so that processed water is circulatable;
a filtration mechanism part configured to include a filtration device of a filter connected to a subsequent part following stage of the wash water storage part via a filtration flow path and an ion exchange resin,
a circulation flow path connecting a subsequent part following stage of the filtration mechanism part and the washing processing part,
TOC concentration measurement means and TOC concentration adjustment means provided midway in the circulation flow path,
a circulation step of a second circulation system having the washing processing part, the wash water storage part, and the filtration mechanism part, the filtration mechanism part and the washing processing part being connected so as to configure the entire wash water processing apparatus without ends, in a circulatable state; and cessing apparatus, wash water satisfying water quality can be provided without wastefully using pure water or ultrapure water.

a control step including the TOC concentration adjustment means which is adjustment means for performing to discharge processed water and supply pure water to prevent elution of TOC from each portion configuring the wash water storage part and the filtration mechanism part and, the apparatus comprises a control apparatus having a memory part storing an arithmetic expression capable of calculating a discharge amount of processed water and a supply amount of pure water in accordance with an ozone-water concentration and a TOC concentration of processed water, wherein: bacteria in the processed water in the wash water storage part are sterilized and decomposed by circulation between the wash water storage part and the sterilization and purification unit; the ozone-water concentration is controlled to a concentration by mixture of processed water flowing in from the washing processing part and stored in the wash water storage part and sterilized and dissolved processed water and by autolysis of ozone;

the control apparatus controls the ozone supply part, by passing low-concentration ozone water having an ozone-water concentration equal to or less than 5.37 mg/L from the wash water storage part through both the filter and the ion exchange resin in order to suppress oxidative deterioration of the filter and the ion exchange resin to reduce a decrease in filtration performance of the filtration mechanism part;

the low-concentration ozone water reduces an occurrence of slime occurring to the filter and the ion exchange resin themselves; and in accordance with a TOC concentration eluted from each portion configuring the wash water storage part and the filtration mechanism part, by discharge of processed water and supply of pure water at the TOC concentration adjustment means, before the washing processing part, the TOC concentration of wash water for use is controlled at a control value equal to or less than a predetermined value in pure water to allow use for cleaning at the washing processing part.

5. The wash water processing method for semiconductor manufacture, liquid-crystal manufacture, and electronic components according to claim 4, wherein the control apparatus calculates the discharge amount of processed water and the supply amount of pure water in accordance with the ozone-water concentration and the TOC concentration of processed water by using the memory part storing a data table.

6. The wash water processing method for semiconductor manufacture, liquid-crystal manufacture, and electronic components according to claim 4, wherein the filter is a hollow fiber membrane filter or an activated carbon filter.

* * * * *